United States Patent
Memezawa et al.

(10) Patent No.: US 6,433,942 B1
(45) Date of Patent: Aug. 13, 2002

(54) OPTICAL APPARATUS

(75) Inventors: Akihiko Memezawa; Kei Sato, both of Miyagi; Kazuyoshi Horie, Saitama; Kuninori Shino, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/486,360

(22) PCT Filed: Jun. 28, 1999

(86) PCT No.: PCT/JP99/03452
§ 371 (c)(1),
(2), (4) Date: Feb. 25, 2000

(87) PCT Pub. No.: WO00/00861
PCT Pub. Date: Jan. 6, 2000

(30) Foreign Application Priority Data

Jun. 26, 1998 (JP) ............................................ 10-181153

(51) Int. Cl.$^7$ ................................................. G02B 5/04
(52) U.S. Cl. ............................. 359/833; 385/36; 385/93
(58) Field of Search ........................... 359/833; 385/92, 385/93, 36, 38; 257/98, 432

(56) References Cited

U.S. PATENT DOCUMENTS 5,546,212 A * 8/1996 Kunikane et al. ............. 385/93
5,764,826 A * 6/1998 Kuhara et al. ................ 385/24

FOREIGN PATENT DOCUMENTS

| JP | 6-37399  | 2/1994 | ............ H01S/3/18 |
| JP | 8-29161  | 2/1996 | ............ G01C/3/06 |
| JP | 10-39180 | 2/1998 | ............ G02B/6/42 |

* cited by examiner

Primary Examiner—Cassandra Spyrou
Assistant Examiner—Euncha Cherry
(74) Attorney, Agent, or Firm—Sonnenschein, Nath & Rosenthal

(57) ABSTRACT

A first surface of an optical component has a lens function of converging the transmission light from a light source. A second surface reflects the transmission light, converged by the lens: function of the first surface, towards an end face of an optical transmission medium as the destination of transmission. The light reflected by the second surface is radaited from a coupling surface. Since the light beam from the light source is directed towards the optical transmission medium by exploiting the total reflection of light, a high-reflection multi-layer film or a polarization beam splitter film, required in a conventional apparatus employing a polarization beam splitter, is unneeded, with the result that the film forming cost or the cost in bonding two prisms used for fabricating the polarization beam splitter may be dispensed with. In this manner, the production cost or size of the apparatus can be reduced without lowering the transmission/reception performance.

10 Claims, 37 Drawing Sheets

| | REFRACTIVE INDEX | CRITICAL ANGLE $\theta$ | ANGLE $\theta_{23}$ |
|---|---|---|---|
| QUARTZ GLASS | 1.46 | 43.2° | 133.2° OR MORE |
| PMMA | 1.49 | 42.2° | 133.2° OR MORE |
| BK7 | 1.52 | 41.1° | 131.1° OR MORE |
| PC | 1.58 | 39.3° | 129.3° OR MORE |
| SF11 | 1.76 | 34.6° | 124.6° OR MORE |

FIG.3

OPTICAL APPARATUS

TECHNICAL FIELD

This invention relates to an optical apparatus suitable for transmission/reception of e.g., signal light for optical communication.

BACKGROUND ART

In these years, in keeping up with information diversification, thus is with the tendency towards multimedia, development of a small-sized, high-performance low-cost communication apparatus has become a desideratum. The optical communication by a two-core optical fiber, having a glass optical fiber for transmission and a glass optical fiber for reception, has already been put to practical use because it permits high transmission rate and long-distance transmission and also because it is strong against electromagnetic noise. However, in the optical communication employing the two-core optical fiber, the optical fiber and the communication apparatus are both expensive, such that it is not used extensively in households and finding only limited practical application. Thus, the recent tendency is towards communication employing a sole inexpensive plastic optical fiber, such that preparations are being made for a communication environment by a uni-core optical fiber.

FIGS. 37 and 38 mainly show the schematic structure of optical components of a conventional optical communication apparatus employing a uni-core optical fiber. FIGS. 37 and 38 show an optical path L11 of the transmitting light along with the schematic structure of an optical system of the optical communication apparatus and an optical path L12 of the transmitting light along with the schematic structure of the optical system of the optical communication apparatus.

As shown in these figures, the optical system of the communication apparatus includes a light source 101 constructed by e.g., a semiconductor laser for radiating a transmitting laser light beam, and a collimator lens 102 for converting the light from the light source 101 into collimated light and for radiating a collimated light beam. The optical system also includes a polarization beam splitter 103 for reflecting the S-polarized component of the incident light substantially by total reflection and transmitting a P-polarized component of the incident light substantially by total transmission. The optical system also includes a coupling lens 104 for converging the transmitting light radiated from the polarization beam splitter 103 on an end face 105a of a uni-core optical fiber 105 and for radiating the received light radiated from the end face 105a of the optical fiber 105 as a collimated light beam. The optical system also includes a converging lens 106 for converging the collimated light beam radiated from the coupling lens 104, and a photodetector 107 for detecting the received light converged by the converging lens 106. The polarization beam splitter 103 includes an inclined surface 103a on the surface of which a dielectric multilayer film is formed for imparting a polarization beam splitter function, that is for reflecting an S-polarized light component of the incident light substantially by total reflection and for transmitting a P-polarized light component thereof substantially by total transmission. In the transmitting/reception device, the light source 101 and the polarization beam splitter 103 are arranged so that the plane of polarization of light radiated from the light source 101 to fall on the inclined surface 103a will the S-polarization plane. Thus, the light from the light source 101 (S-polarized light) undergoes substantially total reflection on the inclined surface 103a.

In the above-described circuit apparatus, employing the polarization beam splitter 103, bidirectional optical communication, that is transmission and reception employing the laser light, becomes possible with the use of a sole device.

The optical communication in the transmission apparatus capable of bidirectional optical communication occurs as follows:

Referring first to FIG. 37, when light is transmitted from the circuit apparatus, the transmitting light is radiated from a light source 101 and collimated by the collimator lens 102 to fall on the polarization beam splitter 103. Since the light source 101 and the polarization beam splitter 103 are arranged relative to each other so that the plane of polarization of the light radiated from the light source 101 to fall on the inclined surface 103a will be the P-polarized light, the light radiated from the light source 101 is reflected substantially by total reflection by the inclined surface 103a. The light beam reflected by total reflection by the inclined surface 103a falls on the end face 105a of the optical fiber 105 via the coupling lens 104. The light incident on the optical fiber 105 is transmitted through the optical fiber 105 to the destination of communication as the signal light for communication.

Referring to FIG. 38, the signal light transmitted through the optical fiber 105 at the time of light reception by the communication apparatus is radiated from the end face 105a of the optical fiber 105. The light beam of the signal light radiated from the end face 105a is collimated by the coupling lens 104 of the communication apparatus so as to fall on the polarization beam splitter 103. The light beam incident on the polarization beam splitter 103 has a random plane of polarization (light of random polarization). Of the light beam incident on the polarization beam splitter 103, the S-polarized light component is reflected substantially by total reflection by the inclined surface 103a so as to be radiated towards the light source 101 as the so-called feedback light. On the other hand, of the light beam incident on the polarization beam splitter 103, the P-polarized light is transmitted through the inclined surface 103a substantially by total transmission to exit the polarization beam splitter 103. The light radiated from the polarization beam splitter 103 is converged by the converging lens 106 on the photodetector 107, which then detects the light converged by the converging lens 106 on photoelectric conversion as a reception signal.

Thus, with the communication apparatus shown in FIGS. 37 and 38, employing the polarization beam splitter 103, bidirectional optical communication employing the laser light becomes possible even though no other device is used.

The polarization beam splitting function of the above-described polarization beam splitter is realized by forming a film structure described below on an optical component.

As the technique of adding an optical function, such as the above-mentioned polarization beam splitter unction, to an optical element, the operation of optical interference, as occurs when setting the film thickness of a transparent thin film to a value of the number of orders of light wavelength, is frequently used.

It is noted that the condition of interference when the light falls on the sole layer film in a perpendicular direction is shown by the following equation:

$$n \times d = m(¼) \times \lambda$$

where $\lambda$ is the light wavelength, n the refractive index of a monolayer film, m an number of orders of interference and d is a physical film thickness. In general, in the above equation, n×d is termed the optical film thickness, while the number of orders of interference m is termed the phase thickness of a quarter wave optical thickness (QWOT). For example, in the case of a thin film in which the wavelength λ of the light used is 550 nm, the refractive index of the monolayer of 2.3 and the physical film thickness d of 59.78 nm, the optical film thickness (n×d) is 137.5 nm, with the optical film thickness, that is the number of orders of interference m, being 1.

Meanwhile, if a single coating or a monolayer is formed on a substrate as an optical element, there are two boundary surfaces having different refractive indexes between the air and the film, that is a boundary surface between the air and the film (first boundary surface), and a boundary surface between the film and a substrate of the optical element (secondary surface). If, in such case, the phase thickness, that is the number of orders of interference m, is an odd number, phase deviation π occurs, so that, as may be seen from the above equation, the reflected waves from the first boundary surface (boundary surface between air and the film) and the reflected waves from the second boundary surface (the boundary surface between the film and the substrate) interfere with each other to give the operation of the reflected waves cancelling each other to a maximum extent. On the other hand, if the phase thickness, that is the value of the number of orders of interference m, is an even number, the phase matching occurs, so that, as may be seen from the above equation, the reflected waves from the first boundary surface (boundary surface between the air and the film) and those from the second boundary surface (boundary surface between the film and the substrate) reinforce each other. Meanwhile, if the value of the phase thickness, that is the number of orders of interference m, is not an integer, there is produced an action lying intermediate between the case where the number of orders of interference is an odd number and that where the number of orders of interference is an even number. Thus, it may be seen that the action of light interference can be controlled by changing the value of the refractive index of the film and the value of the physical film thickness d.

In the above-described polarization beam splitter 103, there is used a thin film structure by multiple layers obtained on alternately layering a thin film of high refractive index and a thin film of low refractive index. The interference operation in the case of the multi-layer film is hereinafter explained.

The optical properties by the action of light interference can be computed by a matrix method employing the optical impedance. For example, if the film refractive index is n, film thickness is d and an angle of incidence of light to the film is θ, the characteristic matrix of a transparent monolayer film can be expressed by the following two-row two-column four-terminal matrix:

$$M = \begin{bmatrix} m11 & m12 \\ m21 & m22 \end{bmatrix}$$

where m11, m22 are represented by cosg (m11=m22=cosg), m12 is represented by i·sing/u (m12=i·u·sing) and m21 is represented by i·u·sing (m21=i·u·sing). On the other hand, g is represented by $2\cdot\pi(n\cdot d\cdot\cos\theta)/\lambda$ (g=2·π(n·d·cosθ)/λ). For S-polarized light and for P-polarized light, u=n·cosλ and u=n·secθ, respectively.

The characteristic matrix M of a multi-layer film is represented by the product of characteristic matrices M1, M2, ..., Mi, where i is an integer not less than 1, as indicated by the following equation:

$$M=(M1)\times(M2)\times\ldots\times(Mi).$$

At this time, the reflectance R of the multi-layer film may be calculated, from the respective elements of the above-mentioned product of the characteristic matrices, the refractive index n0 of an incident medium and a refractive index ns of the substrate, by the following equation:

$$R = \left| \frac{(m11 + i\cdot m12\cdot us)\cdot u0 - (i\cdot m21 + m22\cdot us)}{(m11 + i\cdot m12\cdot us)\cdot u0 + (i\cdot m21 + m22\cdot us)} \right|^2$$

where u0=n0·cosθ0, us=ns·cosθs for the S-polarized light component and u0=n0·secθ0, us=ns·secθs for the S-polarized light component.

The above-described polarization beam splitter 103 may be realized by an alternate layering structure of two sorts of thin-film materials having refractive indices satisfying the so-called Brewster condition.

A more specified illustrative designing of a polarization beam splitter is hereinafter explained.

It is assumed that a polarization beam splitter obtained on bonding two prisms having apex angles of 45° is to be designed as a substrate of a polarization beam splitter. Also, in the present embodiment, the desinging wavelength is 780 nm, and a vitreous material for a prism is SF11 (number of optical glass manufactured by SCHOTT INC.). A, high refractive index thin film material used is $TiO_2$, with a refractive index of 2.30, whilst a low refractive index material used is $SiO_2$ with a refractive index of 1.46.

Since $TiO_2$ with the refractive index of 2.30 and $SiO_2$ with the refractive index of 1.46 are used as the high refractive index material and the low refractive index material, respectively, as a film combination satisfying the Brewster condition, polarization characteristics satisfying the functions of the polarization beam splitter can be obtained by alternately layering $TiO_2$ and $SiO_2$ as shown below. It is noted that a multi-layer film composed of first to sixteenth layers is formed.

first layer $TiO_2$, d=93.9 nm, nd=216.0 nm
second layer $SiO_2$, d=147.9 nm, nd=215.9 nm
third layer $TiO_2$, d=93.9 nm, nd=216.0 mu
fourth layer $SiO_2$, d=147.9 nm, nd=215.9 nm
fifth layer $TiO_2$, d=93.9 nm, nd=216.0 nm
sixth layer $SiO_2$, d=147.9 nm, nd=215.9 nm
seventh layer $TiO_2$, d=93.9 nm, nd=216.0 nm
eighth layer $SiO_2$, d=147.9 nm, nd=215.9 nm
ninth layer $TiO_2$, d=93.9 nm, nd=216.0 nm
tenth layer $SiO_2$, d=147.9 nm, nd=215.9 nm
eleventh layer $TiO_2$, d=93.9 nm, nd=216.0 nm
twelfth layer $SiO_2$, d=147.9 nm, nd=215.9 nm
thirteenth layer $TiO_2$, d=93.9 nm, nd=216.0 nm
fourteenth layer $SiO_2$, d=147.9 nm, nd=215.9 nm
fifteenth layer; $TiO_2$, d=93.9 nm, nd=216.0 nm
sixteenth layer $SiO_2$, d=147.9 nm, nd=215.9 nm That is, of the first to sixteenth layers, odd-numbered layers, that is the first, third, fifth, seventh, ninth, eleventh, thirteenth and fifteenth layers, are of $TiO_2$, whilst even-numbered layers, that is second, fourth, sixth, eighth, tenth, twelfth, fourteenth and sixteenth layers are of $SiO_2$. Moreover, the physical thickness d of the $TiO_2$ layer as an odd-numbered layer is set to, for example, 93.9 nm, whilst the physical thickness d of the $SiO_2$ layer as an even-numbered layer is set to, for example, 147.9 nm. In addition, an optical film thickness nd of a $TiO_2$ layer as an odd-numbered layer is set to 216.0 nm, with optical film thickness nd of a SiO$_2$ layer as an even-numbered layer is set to 215.9 nm.

Meanwhile, the optical communication apparatus employing the above-described polarization beam splitter suffers from the following problems:

First, the polarization beam splitter is in need of high operational reliability, so that the multi-layered film needs to be fabricated by an expensive electron beam evaporator, whilst there are a large number of film layers and a prism needs to be bonded after formation of the multi-layered film, thus increasing the manufacturing cost considerably.

On the other hand, the polarization beam splitter has such optical characteristics that it has high light incident angle dependency, such that, in order to secure the signal to noise ratio of the communication light (communication signals), it is mandatory to provide a collimator lens for collimating the light beam. Moreover, it is necessary to effect optical axis alignment.

In addition, the conventional optical communication apparatus has a drawback that it has a large number of optical components to render integration difficult.

That is, the conventional optical communication apparatus has a drawback that its manufacturing cost is prohibitive and the apparatus tends to be increased in size.

In view of the above-depicted problem of the prior art, it is an object of the present invention to provide an optical apparatus whereby, if the apparatus is used as an optical communication apparatus, it reduces the cost and size of the apparatus without lowering the communication performance.

DISCLOSURE OF THE INVENTION

The present invention provides an optical apparatus including a main body unit of an optical apparatus, an optical transmission medium connector for connecting the optical transmission medium to the main body unit of the optical apparatus so that an end face of the optical transmission medium is at a pre-set angle with respect to the main body unit of the optical apparatus, a light emitting element fixed in the main body unit of the optical apparatus and adapted for radiating the light, and a sole optical element having a second surface facing the first surface and a connecting surface interconnecting the first and second surfaces. The sole optical element is fixed to the main body unit of the optical apparatus. The first surface has the function of converging a light beam of light incident thereon from outside so that the light beam is focused at a position spaced a pre-set distance from the first surface. The light emitting element, optical component and the optical transmission medium connector are secured in the main body unit of the optical apparatus in a relative position such that light radiated from the light emitting element is incident on the optical component via the first surface, the light incident on the first surface traverses the inside of the optical component, the light which has traversed the inside of the optical component is reflected on the second surface of the optical component towards the optical transmission medium connector, the light reflected on the second surface is radiated from the coupling surface to outside the optical component, and the light outgoing from the coupling surface is focussed on an end face of the optical transmission medium.

In the optical apparatus according to the present invention, there is also provided a light receiving element at a position lying on the optical axis of the light radiated from the light transmission medium of the main body unit of the optical apparatus.

The optical component is arranged offset from the optical axis of the light radiated from the optical transmission medium.

The optical component is arranged on the optical axis of the light radiated from the optical transmission medium. The light radiated from the optical transmission medium falls on the coupling surface in the optical component via the coupling surface to traverse the inside of the optical component to fall on the light receiving element.

The optical transmission medium connector connects the optical transmission medium at an angle with which the optical axis of the light radiated from the optical transmission medium is inclined with respect to the optical axis direction of the light radiated from the light emitting element to get to the second surface.

The optical transmission medium connector connects the optical transmission medium at an angle such that the optical axis of the light radiated from the optical transmission medium is included in a plane perpendicular to the optical axis direction of light radiated from the light emitting element to get to the second surface of the optical component.

The light receiving element is arranged on the opposite side of the light emitting element with respect to the second surface of the optical component.

The light receiving element is arranged on the side of the light emitting element with respect to the second surface and the light radiated from the optical transmission medium falls on the optical component via the coupling surface to traverse the inside of the optical component to fall on the light receiving element.

The optical component has a diffractive pattern on the first surface.

The optical component further has a third surface which is provided at an area between the second surface and the coupling surface which is at least proximate to the optical transmission medium connector.

The first surface of the optical component is such that the cross-section obtained on slicing the optical component in a plane passing through a first optical axis of light radiated from the light emitting element and getting to the second surface and through a second optical axis of light radiated from the optical transmission medium is convexed towards the light emitting element.

The first surface of the optical component is such that the cross-section obtained on slicing the optical component in a first plane perpendicular to a second plane passing through a first optical axis of light radiated from the light emitting element and getting to the second surface and through a second optical axis of light radiated from the optical transmission medium is convexed towards the light emitting element, with the first plane passing through the first optical axis.

The optical component has a substantially circular cross-sectional shape which is obtained on slicing the optical component in a plane perpendicular to an optical axis of light radiated from the light emitting element and getting to the second surface.

The second surface exhibits total reflection characteristics.

BRIEF DESCRIPTION OF THE DRAWINGS

FIG. 3 illustrates a specified illustrative designing of an optical component in the optical communication apparatus shown in FIG. 1.

BEST MODE FOR CARRYING OUT THE INVENTION

Figure 1:
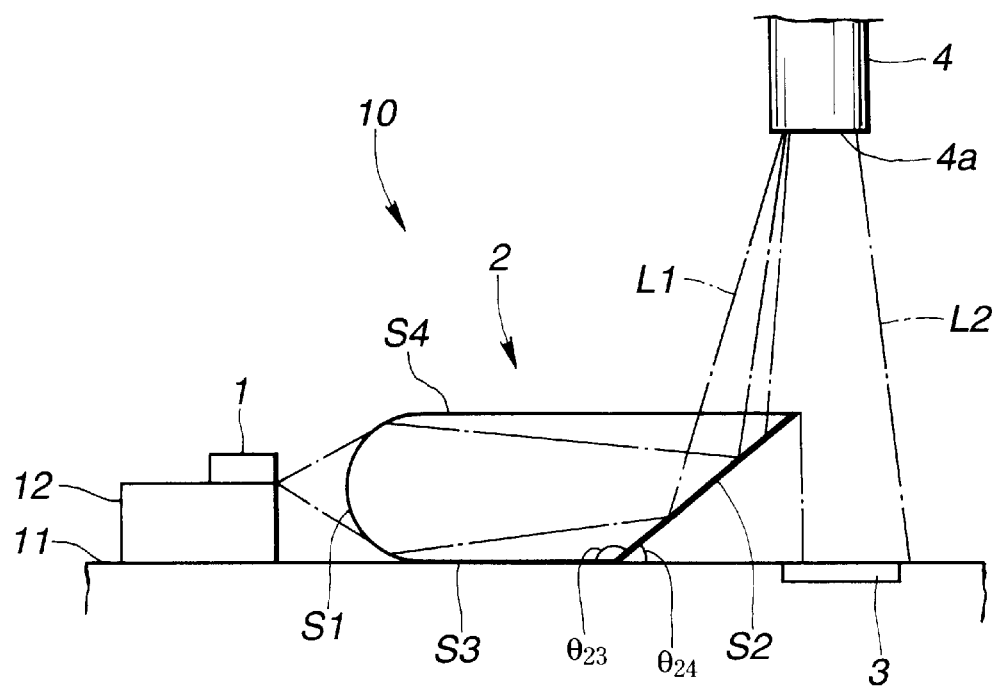
FIG. 1 shows schematics of an optical communication apparatus according to a first embodiment of the present invention.

Referring to the drawings, certain preferred embodiments of the present invention will be explained in detail.

FIG. 1 shows a schematic arrangement of an optical system, as a main portion of an optical communication apparatus 10 for optical communication enabling transmission and reception of changes in light intensity as an optical apparatus embodying the present invention. In FIG. 1, there are also shown an optical path L1 of the transmission system and an optical path L2 of the reception system, along with the arrangement of the optical apparatus.

The optical communication apparatus 10 of the first embodiment includes a light source 1, constituted by a semiconductor laser or a light emitting diodes to emit the transmission light for optical communication, an optical component 2 for guiding the transmission light from the light source 1 to an end face 4a of an optical transmission medium 4 formed by, for example, a unit-core optical fiber, and a photodetector 3 for detecting the receiving light emitted from the end face 4a of the optical transmission, medium 4 as reception signal.

In the present optical communication apparatus 10, shown in FIG. 1, the light source 1, optical component 2 and the photodetector 3 are arranged in a congested configuration in different areas on a substrate 11 of, for example, a semiconductor integrated circuit. The light source 1 is arranged in a congested fashion on the substrate 11 via a support base 12. The photodetector 3 has its portion other than its detection surface buried in the bulk portion of the substrate 11 of, for example, a semiconductor integrated circuit, with a detection surface being on an optical axis of the light radiated from the end face 4a of the optical transmission medium 4 and being at a position facing the end face 4a of the optical transmission medium 4.

Also, in the optical communication apparatus 10 of FIG. 1, the photodetector 3 is arranged on an optical axis of the light radiated from the end face 4a of the optical transmission medium 4, whilst the optical component 2 is arranged at a position offset from the optical axis of the reception light radiated from the end face 4a of the optical transmission medium 4. Stated differently, the respective constituent elements of the optical communication apparatus 10 are arranged so that the reception light radiated from the end face 4a of the optical transmission medium 4 is incident only on the photodetector 3 without being incident on the optical component 2. Also, in the optical communication apparatus 10 of the embodiment of FIG. 1, the optical path L1 of the transmission system is arranged so as not to be overlapped with the optical path L2 of the reception system.

The optical component 2 of the optical communication apparatus 10 is formed of a sole transparent optical material and has a lens function and a prism function. Meanwhile, the lens function in the optical component 2 means light beam converging, numerical aperture (NA) converting functions etc., and realizes the lens function of converging the light beam or converting the NA by the spherical surface, non-spherical surface or the shape of the diffraction lattice. Also, the prism function in the optical component 2 means, the function of changing the spatial direction of the light beam, such as reflection, transmission reflection or diffraction. Also, in the present embodiment, the reflection in the prism function of the optical component 2 means total reflection of light occurring on the boundary surface between an optically dense medium (medium of high refractive index) and an optically sparse medium (medium of low refractive index) when the light proceeding in the optically dense medium falls on the optically sparse medium.

The optical component 2 includes a first surface S1 (lens surface S1) facing the light source 1 and adapted to converge the transmitted light from the light source 1 at a position offset a pre-set distance, and a second surface S2 (reflecting surface S2) provided facing the lens surface S1 and adapted to reflect the transmission light converged by the lens function of the lens surface S1 towards the end face 4a of the optical transmission medium 4. The optical component 2 also includes a bonding surface S3 to the substrate 11 and a surface S4 operating as a radiating surface for radiating the light reflected by the reflecting surface S2. The surface S4 is referred to below as a coupling surface S4 because it operates for coupling the first surface S1 to the second surface S2. Meanwhile, in the optical component 2, it is desirable for the lens surface S1 and the coupling surface S4 to form an anti-reflective surface for reducing the stray light or optical loss. Also, the lens surface S1 and the coupling surface S4 may be subjected in the optical component 2 to refractive index profile processing. In particular, the lens surface S1 is preferably provided with a multi-layer reflection preventative film to achieve anti-reflection effect over a wide angle of incidence.

Also, in the optical component 2, the lens surface S1 producing the lens function has its focal length or the NA designed so that the light beam emitted by the light source 1 will form a focal point on the end face 4a of the optical transmission medium 4. In the: optical component 2, the reflecting surface S2 is a surface responsible for the above-mentioned prism function and is adapted for reflecting the incident light by the total reflection of light generated on the interface between the optically dense medium and the optically sparse medium. That is, this reflecting surface S2 is inclined at a pre-set angle with respect to the optical axis of the light radiated from the light source 1 so as to produce total reflection of the incident light.

Figure 2:
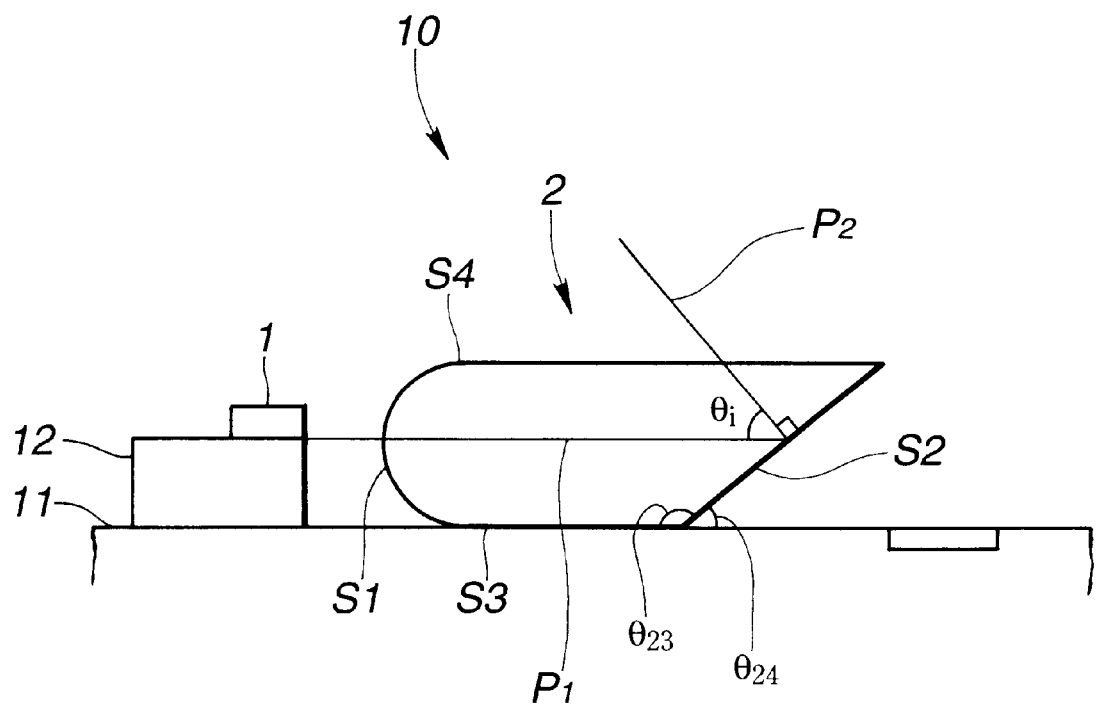
FIG. 2 illustrates total reflection conditions of a reflection surface of an optical component in the optical communication apparatus shown in FIG. 1.

Referring to FIG. 2, the relation between the angle of incidence to the reflective surface S2 of the optical component 2 and the condition of total reflection of light by the reflecting surface S2.

For aiding in the understanding of the optical operation by the optical component 2, it is assumed that the light beam of the transmitted light from the light source 1 is the light beam only along the direction of the directive line, that is that the light beam of the transmitted light is a collimated light beam. Meanwhile, the direction of the directive line means the center vector direction of the light beam from the light source 1.

The angle of incidence $\theta i$ of the transmitted light on the reflecting surface S2 is expressed by the equation (A):

$$\theta i = \theta_{23} - 90° \tag{A}$$

where $\theta_{23}$ is an angle between the reflecting surface S2 and the surface S3. It is noted that the angle of incidence $\theta i$ is an angle between a line of orientation P1 and a normal line P2 drawn to the reflecting surface S2. In FIGS. 1 and 2, the angle the reflecting surface S2 makes with the surface of the substrate 11 is denoted with a reference symbol $\theta_{23}$.

On the other hand, critical angle $\theta c$ of total reflection of light is expressed by the following equation (B):

$$\theta c = \sin^{-1}(1/ng) \tag{B}$$

where ng is the refractive index of the optical component 2.

It is noted that, if the angle of incidence $\theta i$ is larger than or equal to $\theta c$, that is if $\theta i \geq \theta c$, total reflection occurs on the reflecting surface S2. Therefore, the condition for the angle $\theta_{23}$ is represented, from the equations A and B, by the following equation (C):

$$\theta_{23} \geq 90° + \sin^{-1}(1/ng) \tag{C}$$

FIG. 3 shows a computational example for angles $\theta c$ and $\theta_{23}$ in case of applying a material routinely used as an optical material. In FIG. 3, there is shown a computational example for the angles $\theta c$ and $\theta_{23}$ in case of application of a quartz glass and an optical glass BK7 and SF11, manufactured by SCHOTTS INC, as a material routinely used as an optical material. FIG. 3 shows computational examples for the angles $\theta c$ and $\theta_{23}$ in case of applying the polymethyl methacrylate (PMMA) and polycarbonate (PC) as typical plastics materials for optical application. As may be seen from FIG. 3, it is sufficiently possible, in a majority of routine optical materials, to realistically design the optical components 2 in which the reflecting surface S2 brings about total reflection. As may also be seen from FIG. 3, if a material of high refractive index is used as the optical component 2, the critical angle θc is reduced to render it possible to reduce the angle $θ_{23}$.

In the above explanation, the light beam incident on the reflecting surface S2 is assumed to be a collimated light beam. However, in actuality, the light beam incident on the reflecting surface S2 is the light beam converged by the lens operation of the lens surface S1, so that the angle of incidence on the reflecting surface S2 has an angular extent determined by the angle of convergence of the light beam and hence there is a risk that a light beam be produced which is not in meeting with the condition for total reflection. If, on the other hand, the laser light is used as the transmitting light, the intensity of the laser light exhibits the Gaussian distribution, such that the center intensity is high whilst the intensity on the skirts is extremely low. Therefore, if in actuality the angle $θ_{23}$ is increased with the converging angle Δθ (half angle) as an offset, ideal total reflection is achieved even with the converging light beam. If on the other hand, the device size is to be decreased at the cost of the S/N ratio of the device to a slight extent, the angle θi ($=θ_{23}-90°$) may be equal to the critical angle θc of total reflection without taking the angle of convergence into account. The light of an angular range for which the incidence angle of the light beam to the reflecting surface S2 is not larger than the critical angle θc is in the skirt range of the laser light exhibiting the Gaussian distribution, that is the range where the light intensity is extremely low, so that a sufficiently usable S/N ratio can be obtained.

In the optical transmission apparatus, constructed as shown in FIG. 1, the light transmitting and receiving operation is the following:

First, or light transmission from the optical transmission apparatus, the transmitting light is radiated from the light source 1. The light beam of the transmitted light, radiated by the light source 1, is converged by the lens surface S1 of the optical component 2, arranged facing the light source 1, and proceeds through the interior of the optical component 2. The light beam incident from the lens surface S1 is totally reflected by the reflecting surface S2 and radiated via coupling surface S4 towards an end face 4a of the optical transmission medium 4. The light beam radiated from the optical component 2 :forms an image on the end face 4a of the optical transmission medium 4 by the lens operation of the lens surface S1. The light beam incident on the end face 4a proceeds as transmission signal through the optical transmission medium 4 and gets to an optical transmission apparatus of the destination of transmission.

For light reception in the present optical transmission apparatus, the signal light transmitted through the optical transmission medium 4 is radiated from the end face 4a of the optical transmission medium 4. The signal light radiated from the end face 4a is radiated on the photodetector 3. This photodetector 3 photo-electrically converting the incident light, while detecting changes in the intensity of the incident light. The signal light incident on the end face 4a of the optical transmission medium 4 and transmitted through the optical transmission medium 4 is detected as a received signal. Preferably, an anti-reflection film or a filter film transmitting only the signal light (received light) is provided on the surface of the photodetector 3 to transmit only the wavelength of the received light to reduce the optical loss to remove stray light. By providing the filter film or the like, it is possible for the photodetector 3 to detect substantially the totality of the received light to improve the S/N ratio of the apparatus at the time of reception.

Figure 4:
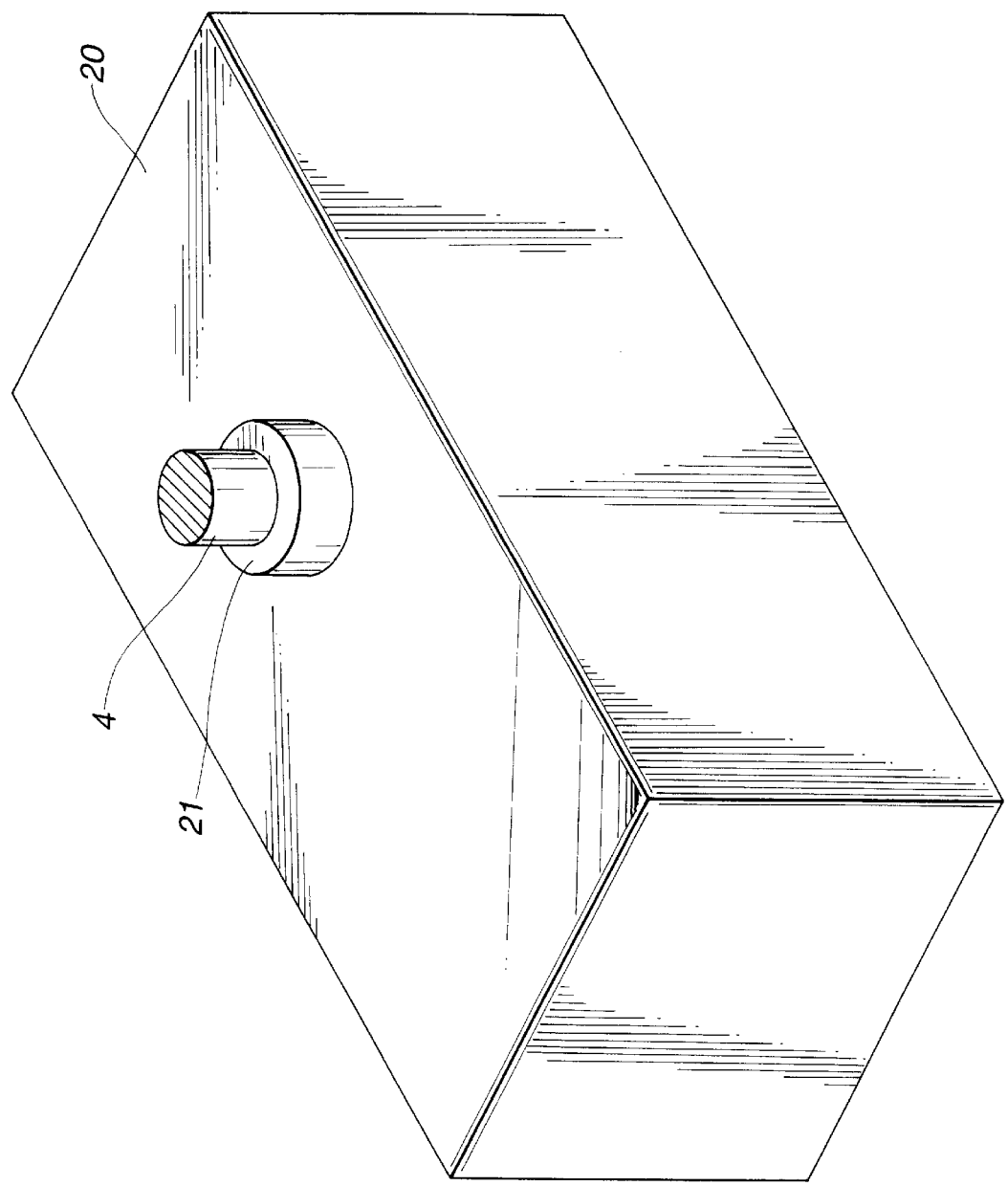
FIG. 4 is a perspective view of a casing of the optical communication apparatus according to the present invention.

The above-described optical communication apparatus, embodying the present invention, is arranged im a casing 20 shown for example in FIG. 4. To the casing 20 can be connected the optical transmission medium 4 as an optical fiber vis a connector 21.

Figure 5:
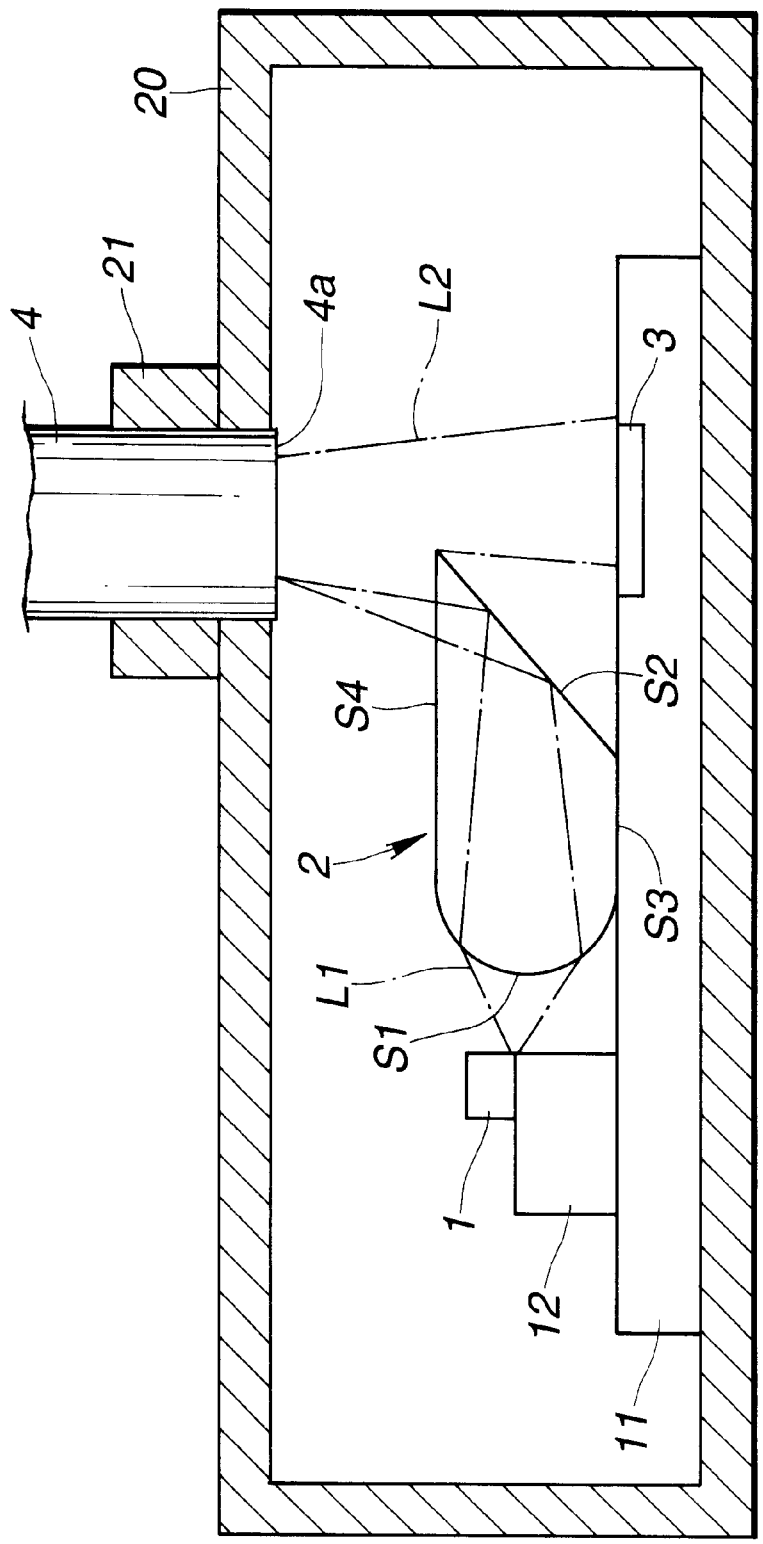
FIG. 5 is a cross-sectional view showing the optical communication apparatus shown in FIG. 1, arranged in a casing.

FIG. 5 shows a cross-sectional view of the components parts of FIG. 1 arranged in the casing 20 of FIG. 4. In FIG. 5, a substrate 11, on which are assembled the support base 12, optical component 2 and the photodetector 3, is secured to the inner bottom surface of the casing 20. On the connector 21 is mounted an optical fiber as the optical transmission medium 4. The relation between the fixed position of the substrate 11 and the arranging position of the connector 21 on the casing is such that the photodetector 3 on the substrate 11 is on the optical axis of the light radiated from the end face 4a of the optical transmission medium 4 mounted on the connector 21.

In the optical communication apparatus 10 of the first embodiment, described above, in which the respective optical elements are arranged so that the optical path L1 of the transmission system will not be overlapped with the optical path R2 of the receiving system, the polarization beam splitter for separating the transmitting light from the receiving light, so far used in the conventional optical communication apparatus, becomes unnecessary. Also, in the optical communication apparatus 10 of the first embodiment, since the light beam from the light source 1 is guided towards the optical transmission medium 4 by exploiting the phenomenon of total reflection of light generated on the boundary surface (reflecting surface S2) on light incidence from an optically dense transparent medium to a rough transparent optical medium, it is unnecessary to form a high reflection multi-layered film or a polarization beam splitter film, in contradistinction from the conventional apparatus employing the polarization beam splitter, thus enabling reduction in costs, such as the cost in forming films or in bonding two prisms used for manufacturing polarization beam splitters.

Also, in the present first embodiment, in which the action of total reflection of light on the reflecting surface S2 of the optical component 2 is exploited, the light is reflected on the reflecting surface S2 at 100% reflectance, without regard to the angle of light incidence, insofar as the condition for total light reflection is met. The reflection on the reflecting surface S2 exhibits extremely small incident angle dependency, so that, if substantially the totality of the converged light from the lens surface S1 is reflected by the reflecting surface S2, the transmitted light suffers from only small loss, as a result of which the deterioration of the S/N ratio is evaded. Thus, in the present first embodiment, the collimator lens for maintaining the S/N ratio as required in the conventional device is not needed to render it possible to diminish the number of components. Moreover, since the optical communication apparatus of the present first embodiment uses the optical component 2 having both the lens and prism functions and which integrates the functions of plural optical components, the number of the optical components can be diminished, at the same time as integration with semiconductor components such as the light source 1 or the photodetector 3 of the semiconductor laser is facilitated to render it possible to reduce the size of the apparatus and the assembling cost. Also, since the optical component 2, as a sole component, has the function as a lens and that as a prism, in combination, it is unnecessary to have plural components, such as polarization beam splitter, as in the conventional device, so that the optical component 2 can be manufactured by a method having high mass-producibility, such as glass pressing or injection molding of plastics, thus enabling cost reduction.

In addition, in the present embodiment of the optical communication apparatus, since the optical path L1 of the transmitting system is not overlapped with the optical path Reflecting surface S2 of the reception system, and hence there is no return light of the received light to the light source 1, no laser noise is produced. Moreover, the conventional apparatus employing the polarization beam splitter discards the S-polarized component, of the received light, thus deteriorating the S/N ratio at the time of reception. Conversely, the present embodiment of the optical communication apparatus, employing an optical system exhibiting no polarization dependency of light, has a superior S/N ratio at the time of reception.

Thus, in the present embodiment, the apparatus can be reduced in size and cost without lowering the&transmission and reception performance.

Figure 6:
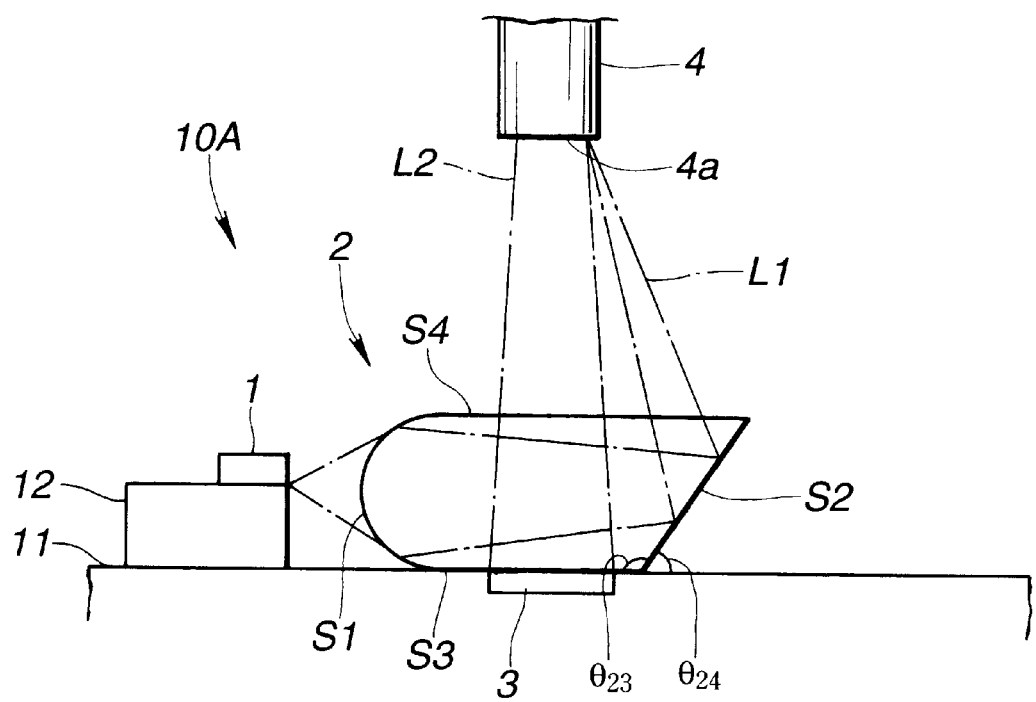
FIG. 6 is a diagrammatic view showing schematics of an optical communication apparatus according to a second embodiment of the present invention.
Figure 7:
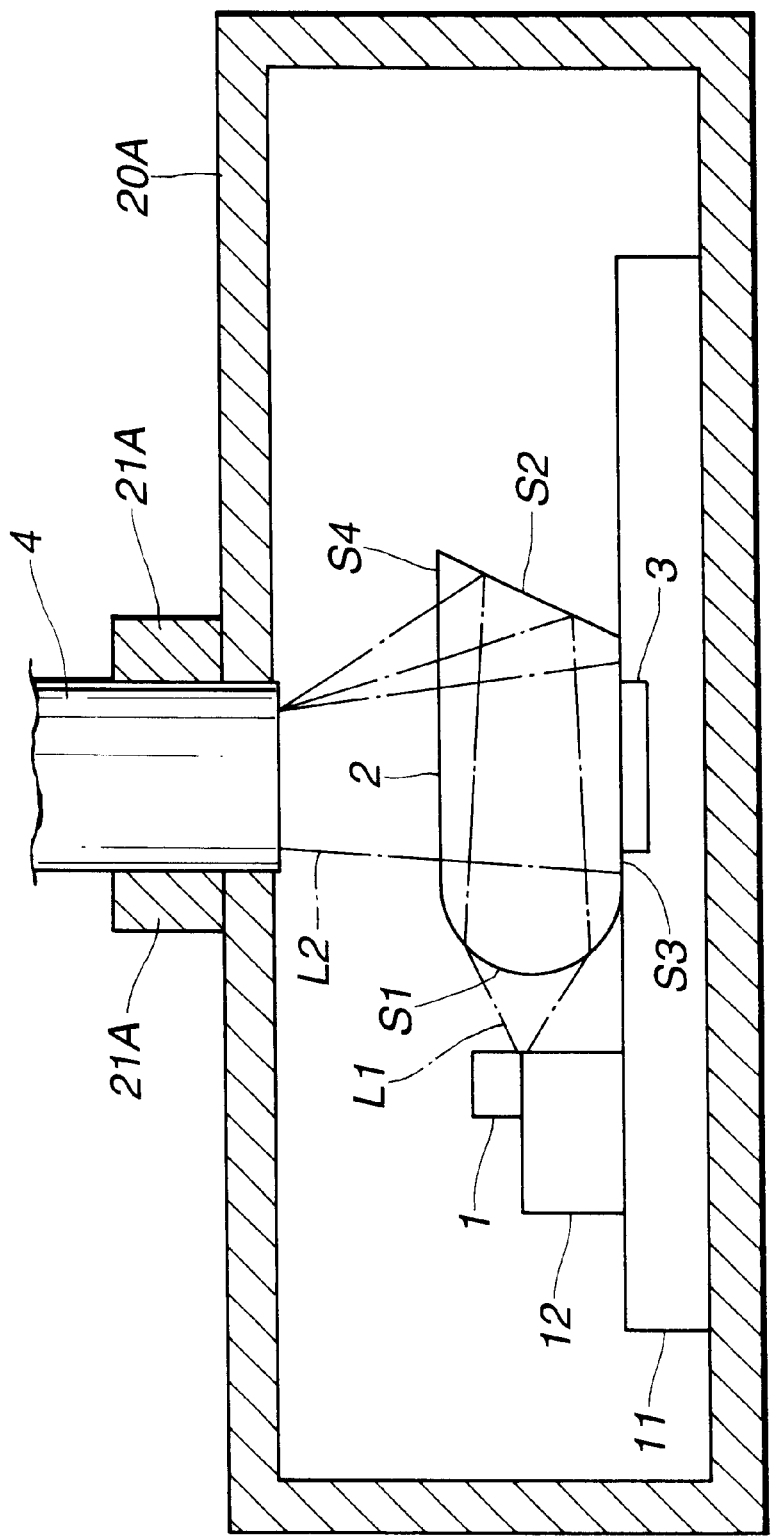
FIG. 7 is a cross-sectional view showing the optical communication apparatus shown in FIG. 1, arranged in a casing.

Referring to FIGS. 6 and 7, a second embodiment of the present invention is explained. In the following description, parts or components which are the same as those of the first embodiment are depicted by the same reference symbols and are not explained specifically.

FIG. 6 shows schematics of an optical communication apparatus 10A according to a second embodiment of the present invention. In the above-described first embodiment, the optical component 2 and the photodetector 3 are arranged on respective different areas in the substrate 11. In the present second embodiment of the optical communication apparatus 10A, the optical component 2 is arranged on the same area on the substrate 11 as that in which the photodetector 3 is buried in the substrate 11. Stated differently, the optical component 2 is arranged on the optical axis of the received light, radiated from the end face 4a of the optical transmission medium 4 is incident via the coupling surface S4 of the optical transmission medium 4 to traverse the interior of the optical component 2 to fall on the photodetector 3. Also, in the present second embodiment, the optical component 2 and the photodetector 3 are arranged so that the optical component 2 has its surface S3 bonded to a detection surface of the photodetector 3.

Thus, in the present second embodiment, the signal light, transmitted by the optical transmission medium 4, is radiated from the end face 4a of the optical transmission medium 4 to fall on the optical component 2 via the coupling surface S4. The light incident from the coupling surface S4 on the optical component 2 is radiated from the surface S3 to reach the photodetector 3 so as to be detected as a reception signal, In the present embodiment, the device can be smaller in size than the device of the first embodiment by arranging the optical component 2 and the photodetector 3 in the same region of the substrate 11.

Meanwhile, in the present second embodiment, the optical component 2 is secured to the photodetector 3. As an adhesive, a transparent adhesive is used to prevent the detection performance of the photodetector 3 from being lowered. Also, in the present embodiment, since the received light falls on the coupling surface S4 of the optical component 2 to get to the photodetector 3 via the surface S3, the latter is preferably processed, for preventing light reflection. If the surface S3 is to be processed for reflection prevention, it is preferred to perform reflection prevention processing taking into account the refractive index and the thickness of the transparent adhesive.

Also, in the present second embodiment, it is preferred to use a material of a refractive index higher than that of the material used in the first embodiment. If the material of a higher refractive index is used, the critical angle θc of total reflection on the reflective surface S2 is decreased such that the condition for total reflection on the reflecting surface S2 of the totality of the light beams incident on the reflecting surface S2 is more liable to be met. Also, in the case of the optical component 2, formed of a high refractive index material, the refractive power on the lens surface S1 can be increased, as the condition for total reflection on the lens surface S1 is met, so that it is possible to reduce the focal length from the lens surface S1 to the end face 4a of the optical transmission medium 4 and hence to reduce the size of the apparatus.

Referring to FIG. 7, the optical communication apparatus 10A of the above-described second embodiment is arranged in the casing 20A similar to that shown in FIG. 4. Meanwhile, FIG. 7 shows a cross-section of the components of FIG. 6 arranged in the casing 20A. In the following description, parts or components which are the same as those of the first embodiment are depicted by the same reference symbols and are not explained specifically.

In the second embodiment, the relative position between the mounting position of the substrate 11 and a connector 21A is such that the optical component 2 and the photodetector 3 on the substrate 11 will be arranged on the optical axis of the light radiated from the lend face 4a of the optical transmission medium 4 mounted on the connector 21A.

In the above-described second embodiment of the optical communication apparatus 10A, in which the optical component 2 and the photodetector 3 are arranged on the same area of the substrate 11, the apparatus can be furtherreduced in size.

Also, with the present second embodiment of the optical communication apparatus 10A, as in the first embodiment, the polarization beam splitter, so far used for separating the transmission light and the reception light from each other, becomes unnecessary, so that it becomes unnecessary to form a high reflection multi-layered film or a polarization beam splitter film, thus allowing to reduce the costs incurred in film deposition or bonding two prisms used for manufacturing the polarization beam splitter. Moreover, in the present second embodiment, as in the first embodiment, the transmission light can be reflected substantially in its entirety on the reflecting surface S2, so that loss in the transmission light is reduced, while a collimator lens for assuring the S/N ratio performance as required in the conventional apparatus is redundant to render it possible to reduce the number of components. Also, in the optical communication apparatus 10A of the second embodiment, as in the first embodiment, the optical component, 2, which has integrated plural optical components, is used, thus allowing to reduce the number of optical components, the size of the apparatus and the assembling costs and to facilitate integration of respective components. Moreover, the optical component 2 can be produced by a manufacturing method of high mass-producibility to allow for cost reduction. Also, in the optical communication apparatus 10A of the second embodiment, similarly to the first embodiment, there is no return light of the reception light to the light source 1, no laser noise etc. is produced. Moreover, the S/N ratio on reception is excellent because the optical system having no light polarization dependency is used.

Figure 8:
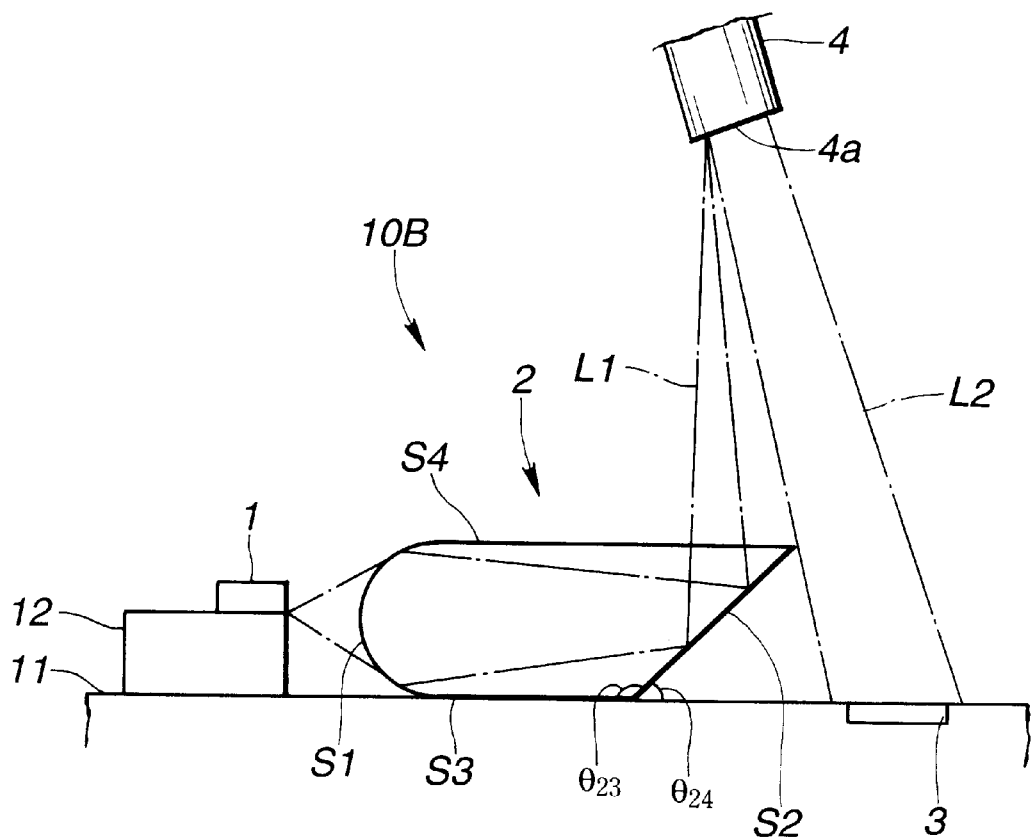
FIG. 8 is a diagrammatic view showing schematics of an optical communication apparatus according to a third embodiment of the present invention.
Figure 9:
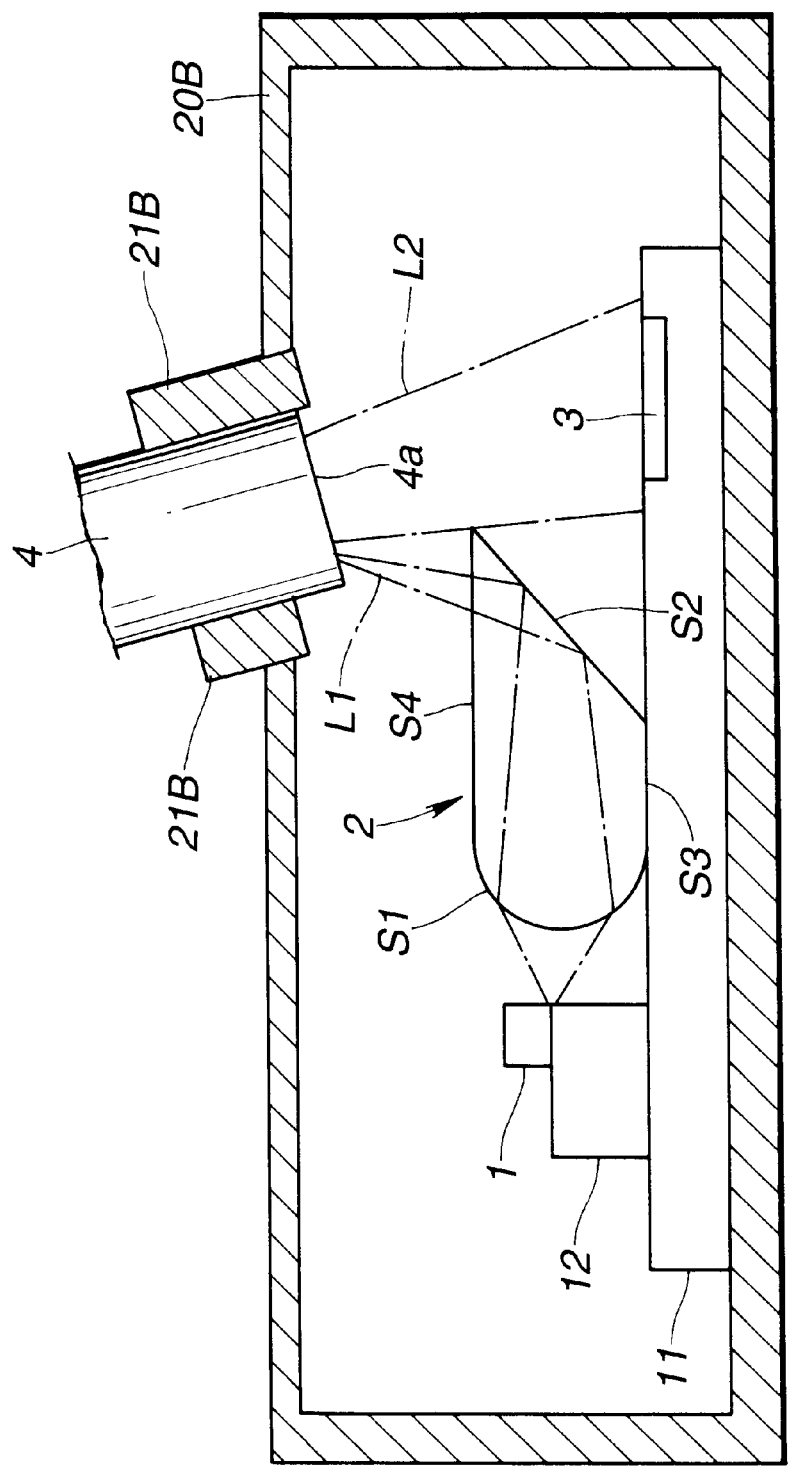
FIG. 9 is a cross-sectional view showing the optical communication apparatus shown in FIG. 8, arranged in a casing.

Referring to FIGS. 8 and 9, a third embodiment of the present invention is explained. In the following description, parts or components which are the same as those of the first embodiment are depicted by the same reference symbols and are not explained specifically.

FIG. 8 shows schematics of the optical communication apparatus 10B according to an embodiment of the present invention. In the optical communication apparatus 10B of the present third embodiment, the photodetector 3 is arranged on the optical axis of the reception light radiated from the end face 4a of the optical transmission medium 4, whilst the optical component 2 is arranged at a position offset from the optical axis of the reception light radiated from the end face 4a of the optical transmission medium 4.

Also, in the present third embodiment, an angle $\theta_{23}$, which the reflecting surface S2 of the optical component 2 makes with the surface S3 is set to 135°, that is the angle the reflecting surface S2 makes with the surface of the substrate 11 is set to 45°. At this time, the material of the optical component 2 needs to be such a material as satisfies the conditions for total reflection even with the angle $\theta_{23}$ of 135°. Meanwhile, the optical materials shown in FIG. 3 all satisfy the conditions for total reflection even if the angle $\theta_{23}$ is set to 135°. It is noted that the ant-reflection processing needs to be performed on the lens surface S1 and the coupling surface S4.

Since the angle $\theta_{23}$ is set in the present third embodiment to 135°, the light converging position of the transmission light is substantially directly above the reflecting surface S2. Therefore, the end face 4a of the optical transmission medium 4 is arranged substantially directly above the reflecting surface S2. However, the optical transmission medium 4 is tilted so that the optical axis of the reception light radiated from the optical transmission medium 4 will be outside the optical component 2 with respect to the light source 1. Since the optical transmission medium 4 has its end tilted, in the present third embodiment, the signal light transmitted by the optical transmission medium 4 is radiated from the end face 4a of the optical transmission medium 4 so as to be radiated on the photodetector 3 without falling on the optical component 2.

The optical communication apparatus 10B of the above-described third embodiment is arranged in the casing 20B, as shown in FIG. 9. FIG. 9 shows a cross-section of the respective components of FIG. 8 enclosed in the casing 20B.

In the present third embodiment, the connector 21B connects the optical transmission medium 4 at an angle such that the optical axis of the radiated light from the end face 4a of the optical transmission medium 4 is inclined with respect to the plane perpendicular to the direction of the optical axis of the transmission light radiated from the light source 1 to get to the reflecting surface S2 of the optical component 2. That is, in the present third embodiment, the connector 21B is arranged so that the optical transmission medium 4 will be arranged obliquely relative to the casing 20B. Also, the connector 21B is arranged with a tilt relative to the optical component 2 and the photodetector 3 so that the endface 4a of the optical transmission medium 4 mounted on the connector 21B faces the reflectingsurface S2 of the optical component 2, the optical axis of the reception light radiated from the optical transmission medium 4 is outside the optical component 2 with respect to the light source 1, and so that the radiated light from the optical transmission medium 4 will fall only on the photodetector 3 without falling on the optical component 2.

With the above-described third embodiment of the optical communication apparatus 10B, in which the angle $\theta_{23}$ in the reflecting surface S2 of the optical component 2 is set to 135°, the optical component 2 can be manufactured easily at a low cost.

Figure 10:
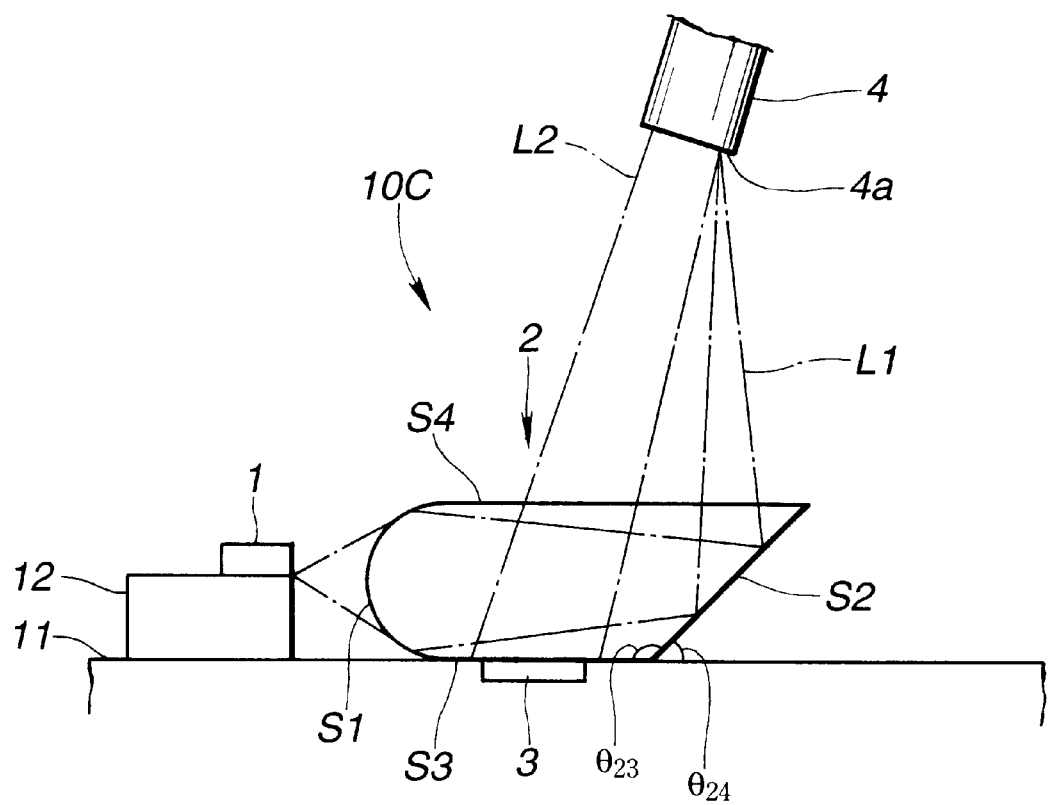
FIG. 10 is a diagrammatic view showing schematics of an optical communication apparatus according to a fourth embodiment of the present invention.
Figure 11:
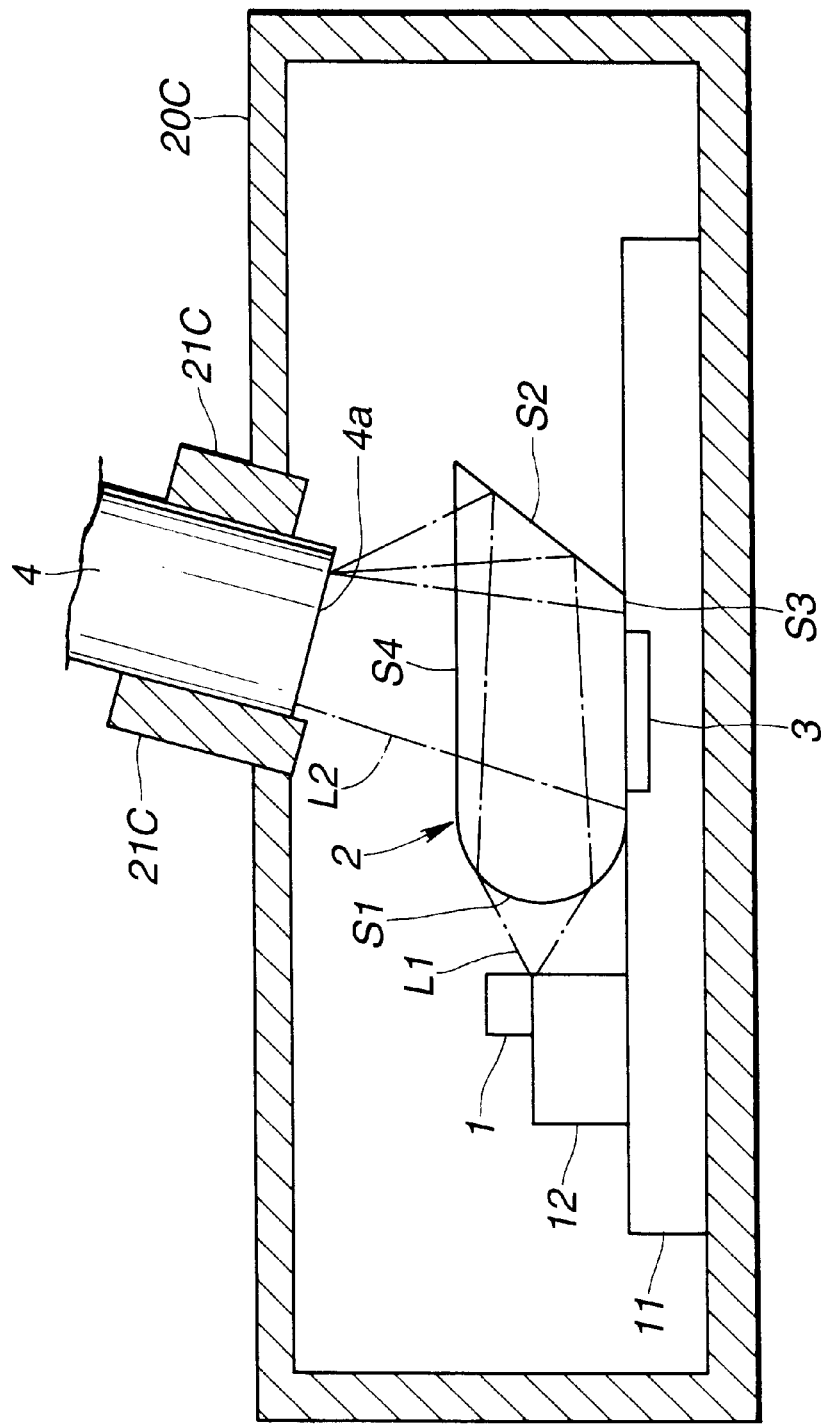
FIG. 11 cross-sectional view showing the optical communication apparatus shown in FIG. 10, arranged in a casing.

Referring to FIGS. 10 and 11, a fourth embodiment of the present invention is explained. In the following description, parts or components which are the same as those of the first embodiment are depicted by the same reference symbols and are not explained specifically.

FIG. 10 is a diagrammatic view showing the schematics of an optical communication apparatus 10C according to the fourth embodiment of the present invention. The optical communication apparatus 10C of the third embodiment has both the feature of the above-described second and thirds embodiments. That is, in the present fourth embodiment of the optical communication apparatus 10C, the optical component 2 is arranged on the optical axis of the reception light radiated from the end face 4a of the optical transmission medium 4, the reception light radiated from the end face 4a of the optical transmission medium 4 will be incident on the coupling surface S4 of the optical component 2 to fall on the photodetector 3 via the interior of the optical component 2 and the angle $\theta_{23}$ on the reflecting surface S2 of the optical component 2 is set to 135° C.

In the present fourth embodiment, the optical transmission medium 4 is arranged so as to directly overlie the reflecting surface S2 of the optical component 2, while being tilted at a distal end thereof so that the light beam of the reception light radiated from the end face 4a will be incident from the coupling surface S4 to get to the photodetector 3 via the surface S3 without falling on the reflective surface S2. Meanwhile, in the present fourth embodiment, the direction of tilt of the optical transmission medium 4 is opposite to that in the third embodiment.

In the present fourth embodiment, the signal light transmitted by the optical transmission medium 4 tilted in the opposite direction to that in the third embodiment is radiated from the end face 4a of the optical transmission medium 4 to fall on the optical component 2 via the coupling surface S4. The light incident on the optical component 2 reaches the photodetector 3 via the surface S3 so as to be detected by this photodetector 3 as a reception signal.

The optical communication apparatus 10C of the above-described fourth embodiment is arranged in the casing 20C, as shown in FIG. 11 FIG. 11 shows a cross-section of the respective component parts of FIG. 10 arranged in the casing 20C.

In the present fourth embodiment, the connector 21C connects the optical transmission medium 4 at an angle with which the optical axis of the light radiated at the end face 4a of the optical transmission medium 4 is inclined relative to the casing 20C. That is, in the present fourth embodiment, the connector 21C is provided so that the optical transmission medium 4 will be inclined obliquely relative to the casing 20C. The connector 21C is located relative to the optical component 2 and the photodetector 3 so that the end face 4a of the optical transmission medium 4 mounted on the connector 21C is inclined in an opposite direction to that in the embodiment of FIG. 9 and so that the optical; component 2 and the photodetector 3 will be arranged on the optical axis of the light radiated from the end face 4a of the optical transmission medium 4 mounted on the connector 21C.

With the above-described fourth embodiment of the optical communication apparatus 10C, since the optical component 2 and the photodetector 3 are arranged on the same area of the substrate 11, and the angle $\theta_{23}$ on the reflecting surface S2 of the optical component 2 is set to 135°, it is possible to reduce the size and the cost of the apparatus further.

Also, with the above-described fourth embodiment of the optical communication apparatus 10C, as in the first to third embodiments, it is possible to reduce the size and the production cost of the apparatus, while it is possible to reduce the deterioration in the signal S/N ratio.

Figure 12:
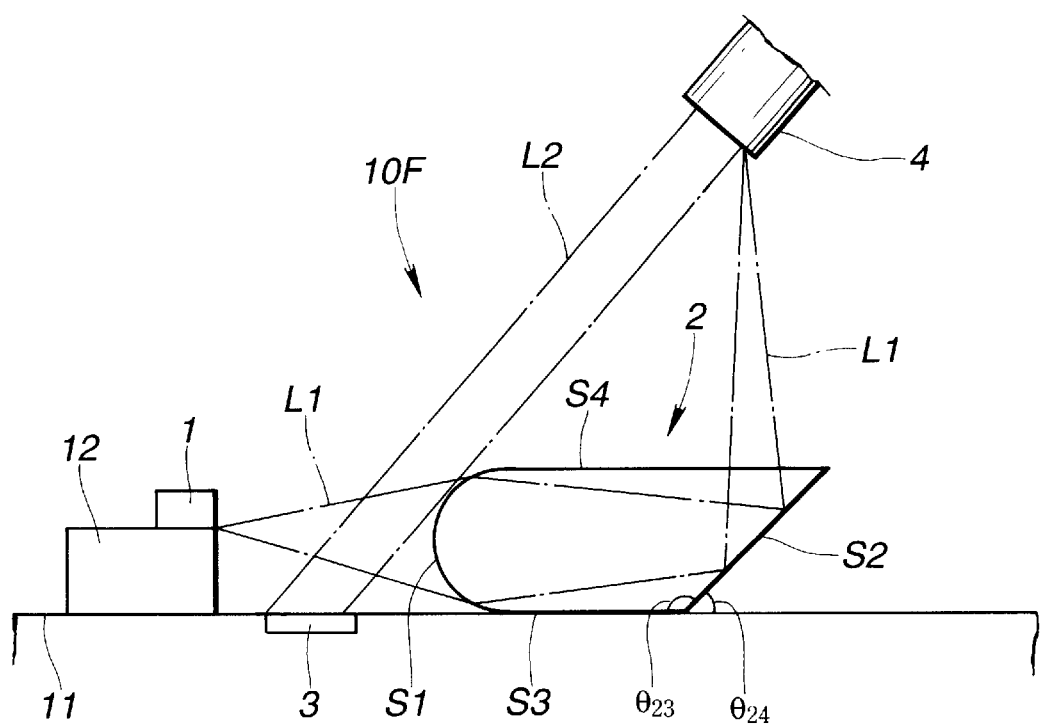
FIG. 12 is a diagrammatic view showing schematics of an optical communication apparatus according to a fifth embodiment of the present invention.
Figure 13:
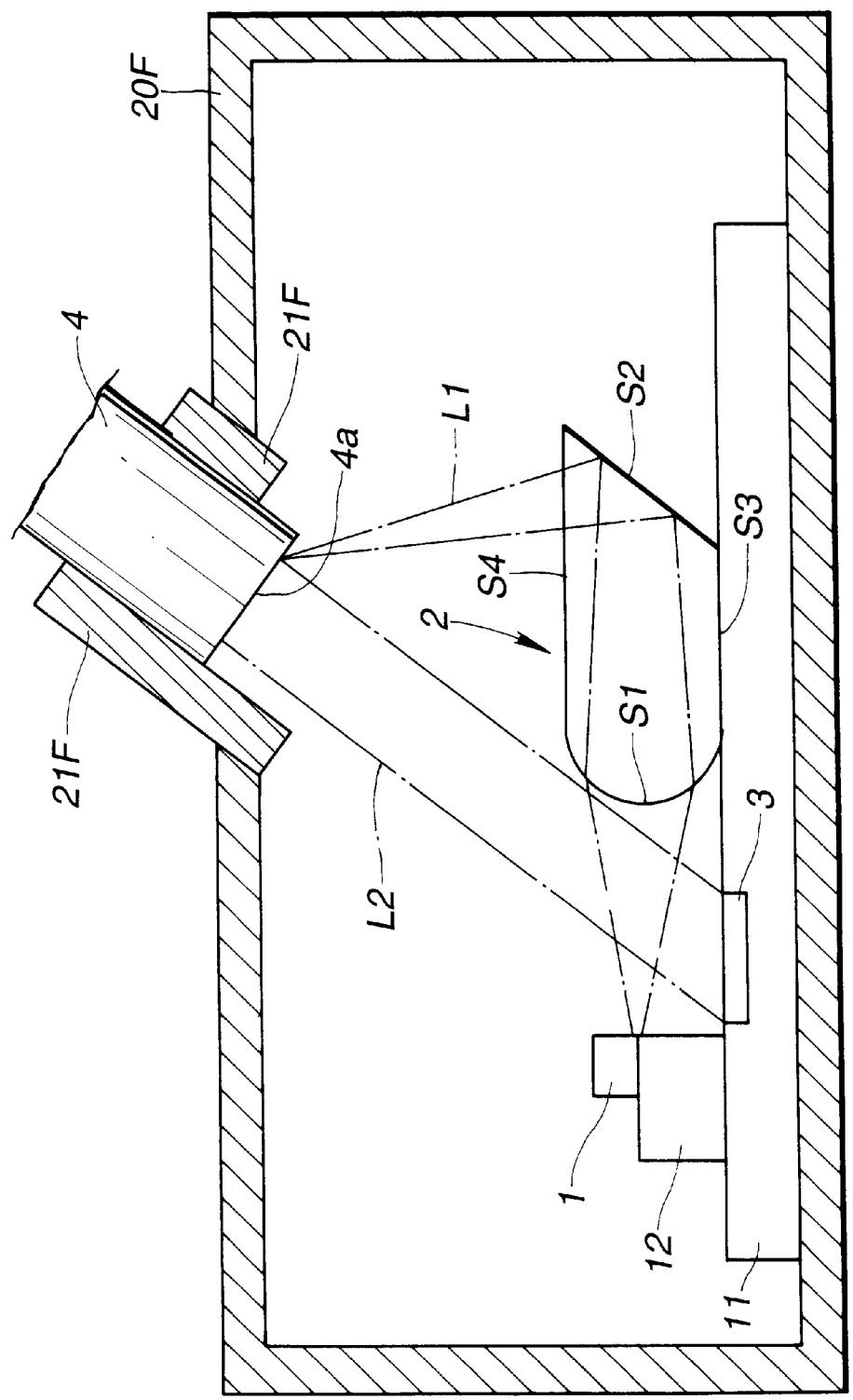
FIG. 13 is a cross-sectional view showing the optical communication apparatus shown in FIG. 12, arranged in a casing.

Referring to FIGS. 12 and 13, a fifth embodiment of the present invention is explained. In the following description, parts or components which are the same as those of the first embodiment are depicted by the same reference symbols and are not explained specifically.

FIG. 12 is a diagrammatic view showing the schematics of an optical communication apparatus 10F according to the fifth embodiment of the present invention. In the present fifth embodiment, the photodetector 3 is arranged between the light source 1 and the optical component 2. In the present fifth embodiment, the optical transmission medium 4 is arranged at a pre-set tilt so that the reception light radiated from the end face 4a will be illuminated on the photodetector 3. Specifically, with the present fifth embodiment, the photodetector 3 is arranged on the optical axis of the reception light radiated from the end face 4a of the optical transmission medium 4, whilst the optical component 2 is arranged at a position offset from the optical axis of the reception light radiated from the end face 4a of the optical transmission medium 4.

The arrangement of the present fifth embodiment is suitably used if, due to the constraint form apparatus designing, the photodetector 3 cannot be arranged opposite side of the reflecting surface S2 of the optical component 2 looking from the light source 1 as in the above-described first and third embodiments, or if it is desired to prevent the lowering of the light volume of the reception light caused by providing the photodetector 3 below the optical component 2.

The optical communication apparatus 10F is arranged within the casing 20F, as shown in FIG. 13, showing the respective component parts of FIG. 12 arranged in the casing 20F in a cross-sectional view.

In the present fifth embodiment, the connector 21F connects the optical transmission medium 4 at an angle with which the optical axis of the light radiated from the end face 4a of the optical transmission medium 4 is inclined relative to the plane perpendicular to the direction of the optical axis of the transmission light radiated from the light source 1 to get to the reflecting surface S2 of the optical component 2. That is, in the present fifth embodiment, a connector 21F is provided for connecting the optical transmission medium 4 obliquely relative to the casing 20F. Also, the connector 21F is arranged so that the optical axis of the light radiated from the end face 4a of the optical transmission medium 4 mounted on the connector 21F is on the photodetector 3 arranged between the light source 1 and the optical component 2.

In the fifth embodiment of optical communication apparatus 10F, in which the photodetector 3 can be arranged between the photodetector 3 and the optical component 2, it is possible to raise the degree of freedom in apparatus designing to prevent the lowering of the light volume of the reception light.

With the fifth embodiment of the optical communication apparatus 10F, as with the first to fourth embodiment,, it is possible to reduce the size and the production cost of the apparatus, while it is possible to prevent the signal S/N ratio from being lowered.

Figure 14:
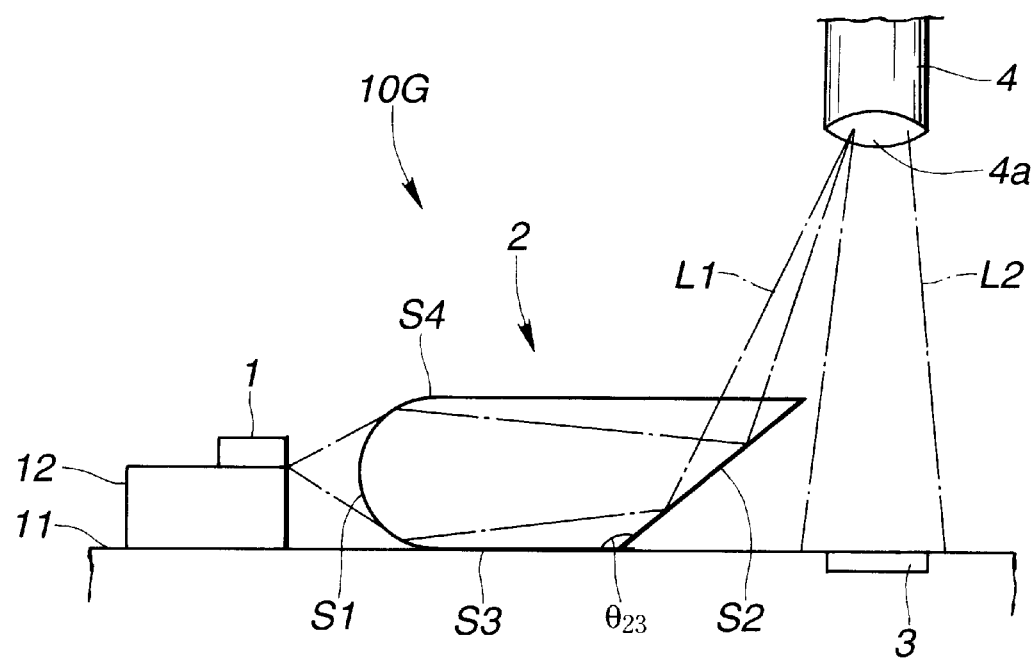
FIG. 14 is a diagrammatic view showing schematics of an optical communication apparatus according to a sixth embodiment of the present invention.
Figure 15:
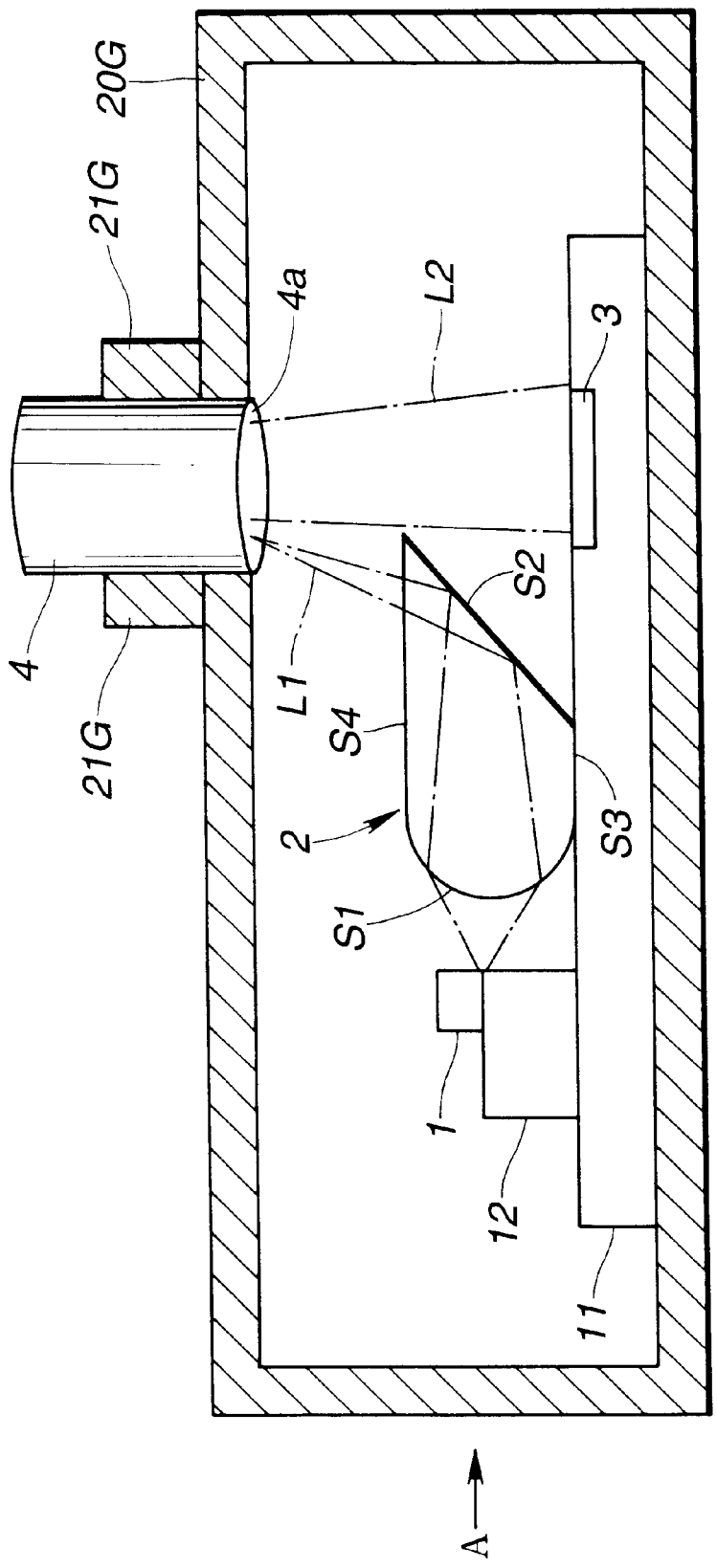
FIG. 15 is a cross-sectional view showing the optical communication apparatus shown in FIG. 14, arranged in a casing, and looking from the side of an arrow A in FIG. 15.
Figure 16:
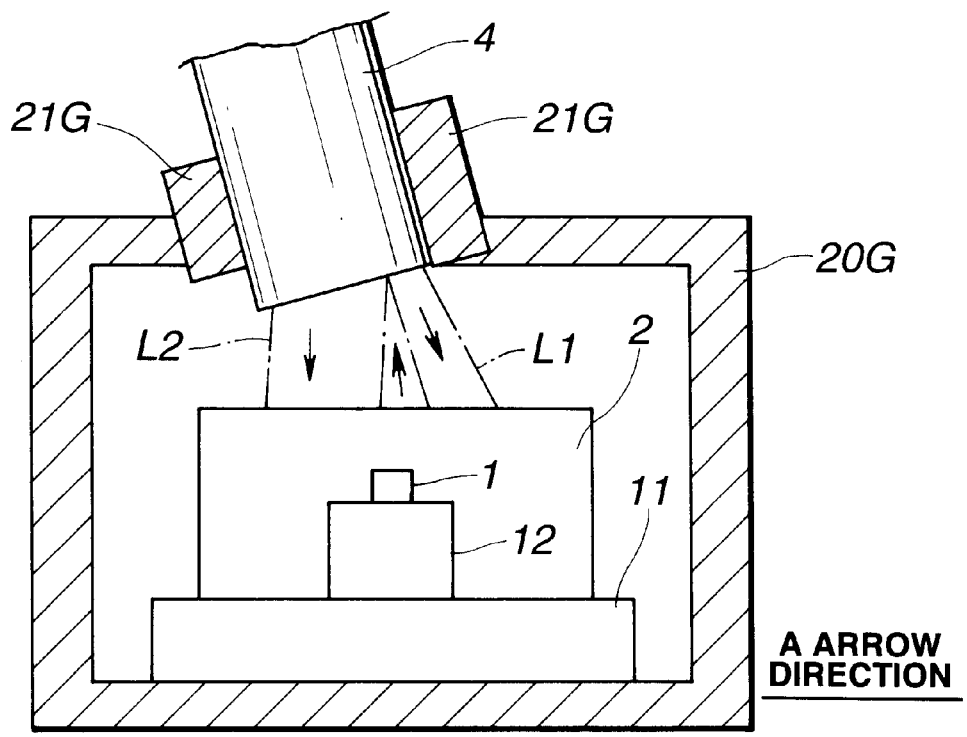
FIG. 16 is a cross-sectional view showing the optical communication apparatus shown in FIG. 14, arranged in a casing, and looking from the side of an arrow A in FIG. 15.

Referring to FIGS. 14 to 16, a sixth embodiment of the present invention is explained. In the following description, parts or components which are the same as those of the first embodiment are depicted by the same reference symbols and are not explained specifically.

FIG. 14 is a diagrammatic view showing the schematics of an optical communication apparatus 10G according to the sixth embodiment of the present invention. In the present sixth embodiment, the photodetector 3 is arranged on the optical axis of the, reception light radiated from the end face 4a of the optical transmission medium 4, whilst the optical component 2 is arranged at a position offset from the optical axis of the reception light radiated from the end face 4a of the optical transmission medium 4. In addition, the arranging angle of the optical transmission medium 4 is tilted so that the optical axis of the reception light radiated from the optical transmission medium 4 will be inclined relative to the plane which contains the optical axis radiated from the light source 1 to get to the reflecting surface S2 and which is perpendicular to the substrate 1. Meanwhile, the reflecting surface S2 of the optical component 2 is inclined so that the angle between it and the substrate 11 will be equal to the aforementioned angle $\theta_{23}$.

The optical communication apparatus 10G of the above-described fourth embodiment is arranged in a casing 20G, as shown in FIG. 15, showing a cross-section of the respective component parts of FIG. 14 arranged in the casing 20G. Meanwhile, FIG. 16 shows a cross-section showing the state in which the optical communication apparatus 10G of the sixth embodiment is arranged in the casing 20G, with the optical communication apparatus 10G being viewed from the direction of an arrow A in FIG. 15.

That is, in the present sixth embodiment, the connector 21G is arranged on the casing 20, so that the optical axis of the reception light radiated from the end face 4a of the optical transmission medium 4 will be inclined relative to the plane containing the optical axis of the light radiated from the light source 1 to get the reflecting surface S2 and which is perpendicular to the substrate 11, as shown in FIGS. 15 and 16.

The optical communication apparatus 10G of the present sixth embodiment is suitably employed if, due to constraint in apparatus designing, the connector 21G cannot be arranged at right angles to the casing surface, as when the optical transmission medium 4 cannot be arranged at right angles to the casing surface, or if the photodetector 3 cannot be arranged on a plane containing the optical axis of the light radiated from the light source 1 to get to the reflecting surface S2 and which is normal to the substrate 1.

With the present sixth embodiment, the configuration of the above-described third to fifth embodiments can be used in combination. That is, in the above-described third to fifth embodiments, as in the sixth embodiment, the arranging angle of the optical transmission medium 4 can be tilted so that the optical axis of the reception light radiated from the optical transmission medium 4 will be inclined with respect to the plane containing the optical axis of the light radiated from the light source 1 to get to the reflecting surface S2 and which is normal to the substrate 1.

In the present sixth embodiment, the optical axis of the transmission light radiated by the light source so as to be reflected by the reflecting surface S2 traverses a plane containing the optical axis of the light radiated from the light source 1 to get to the reflecting surface S2 and which is normal to the substrate 1. Alternatively, the optical axis of the transmission light radiated from the light source 1 and which is reflected by the reflecting surface S2 may be inclined relative to the plane containing the optical axis of the light radiated from the light source 1 to get to the reflecting surface S2 and which is normal to the substrate 11. However, in this case, the reflecting surface S2 needs to be inclined at the aforementioned angle of $\theta_{23}$ to the substrate 11 and also needs to be inclined relative to the plane perpendicular to the optical axis the light radiated from the light source 1 to get to the reflecting surface S2.

In the above-described sixth embodiment of the optical communication apparatus 10G, in which the optical transmission medium 4 can be arranged so that the optical axis of the reception light radiated from the end face 4a of the optical transmission medium 4 will be inclined relative to the plane containing the optical axis of the light radiated from the light source 1 to get to the reflecting surface S2 and which is normal to the substrate 11, it is possible to raise the degree of freedom in apparatus designing.

With the sixth embodiment of the optical communication apparatus 10G, as with the first to sixth embodiments, it is possible to reduce the size and the production cost of the apparatus, while it is possible to prevent the signal S/N ratio from being lowered.

Figure 17:
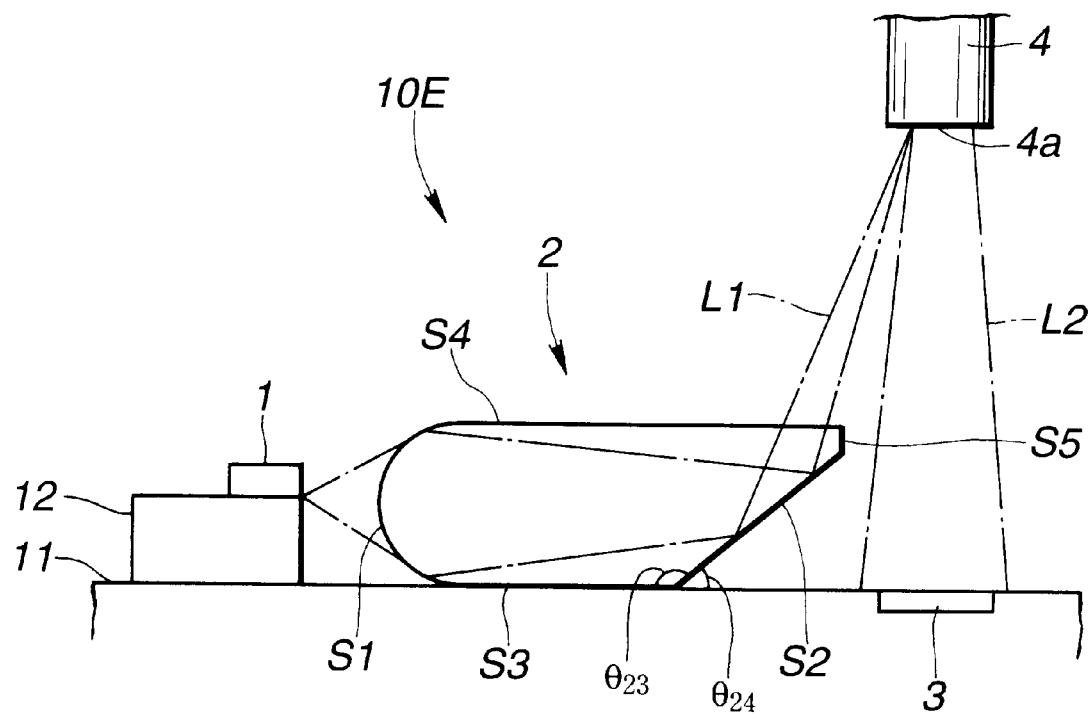
FIG. 17 is a diagrammatic view showing schematics of an optical communication apparatus according to a seventh embodiment of the present invention.
Figure 18:
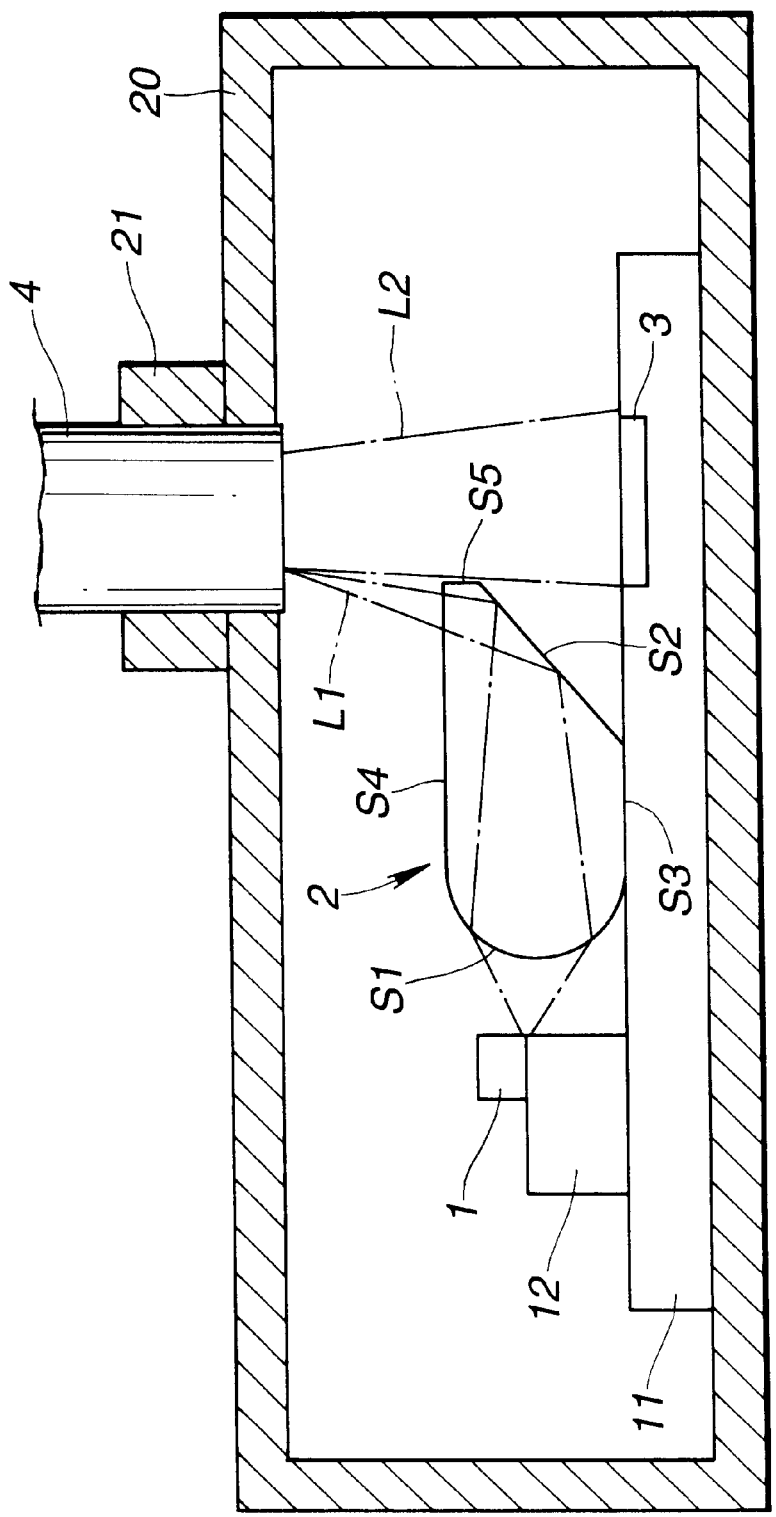
FIG. 18 cross-sectional view showing the optical communication apparatus shown in FIG. 17, arranged in a casing.

Referring to FIGS. 17 and 18, a seventh embodiment of the present invention is explained. In the following description, parts or components which are the same as those of the first embodiment are depicted by the same reference symbols and are not explained specifically.

FIG. 17 is a diagrammatic view showing the schematics of an optical communication apparatus 10E according to the seventh embodiment of the present invention.

In the above-described first embodiment, the reflecting surface S2 of the optical component 2 intersects the coupling surface S4 at an acute angle. In the present seventh embodiment of the optical communication apparatus 10E, the region of the optical component 2 where the reflecting surface S2 intersects the coupling surface S4, that is the at least a portion of the reflecting surface and the coupling surface S4 close to the optical transmission medium 4, is provided with a cut-out surface S5. Meanwhile, FIG. 17 shows an example in which the cut-out surface S5 is provided in the optical component 2 in case the respective components of the optical communication apparatus 10E are arranged similarly to the arrangement of FIG. 1. However, the cut-out surface S5 may similarly be provided on the optical component 2 of the third embodiment shown in FIG. 8 or on the optical component 2 of the sixth embodiment shown in FIG. 14.

The optical communication apparatus 10E of the above-described seventh embodiment is arranged in a casing 20, as shown in FIG. 18, showing a cross-section of the respective component parts of FIG. 17 arranged in the casing 20.

In the above-described seventh embodiment of the optical communication apparatus 10E, in which the cut-out surface S5 is provided at an area of intersection of the reflecting surface S2 of the optical component 2 and the coupling surface S4, it is possible to prevent the reception light radiated by the end face 4a of the optical transmission medium 4 to proceed towards the photodetector 5 from being kicked by the optical component 2, as well as to prevent the optical component 2 from being angled acutely. This gives a merit that the optical component 2 can be improved in safety in operation to render the optical component 2 more robust against destruction.

In the optical communication apparatus 10E of the seventh embodiment, as in the first to sixth embodiments, it becomes to reduce the cost and size of the apparatus as well as to prevent deterioration of the S/N ratio.

Figure 19:
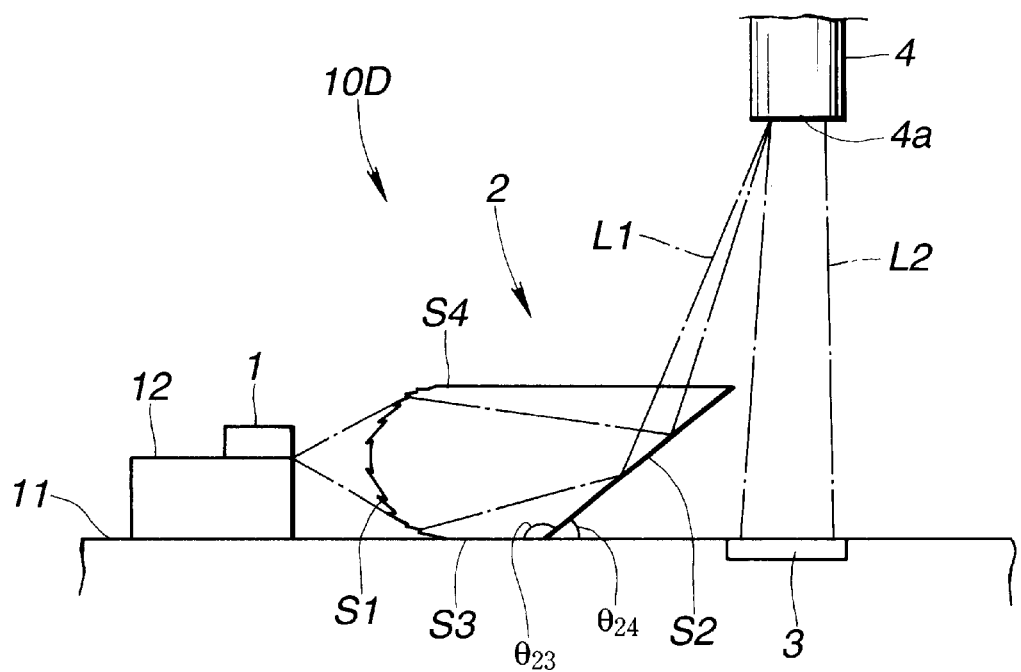
FIG. 19 is a diagrammatic view showing schematics of an optical communication apparatus according to an eighth embodiment of the present invention.
Figure 20:
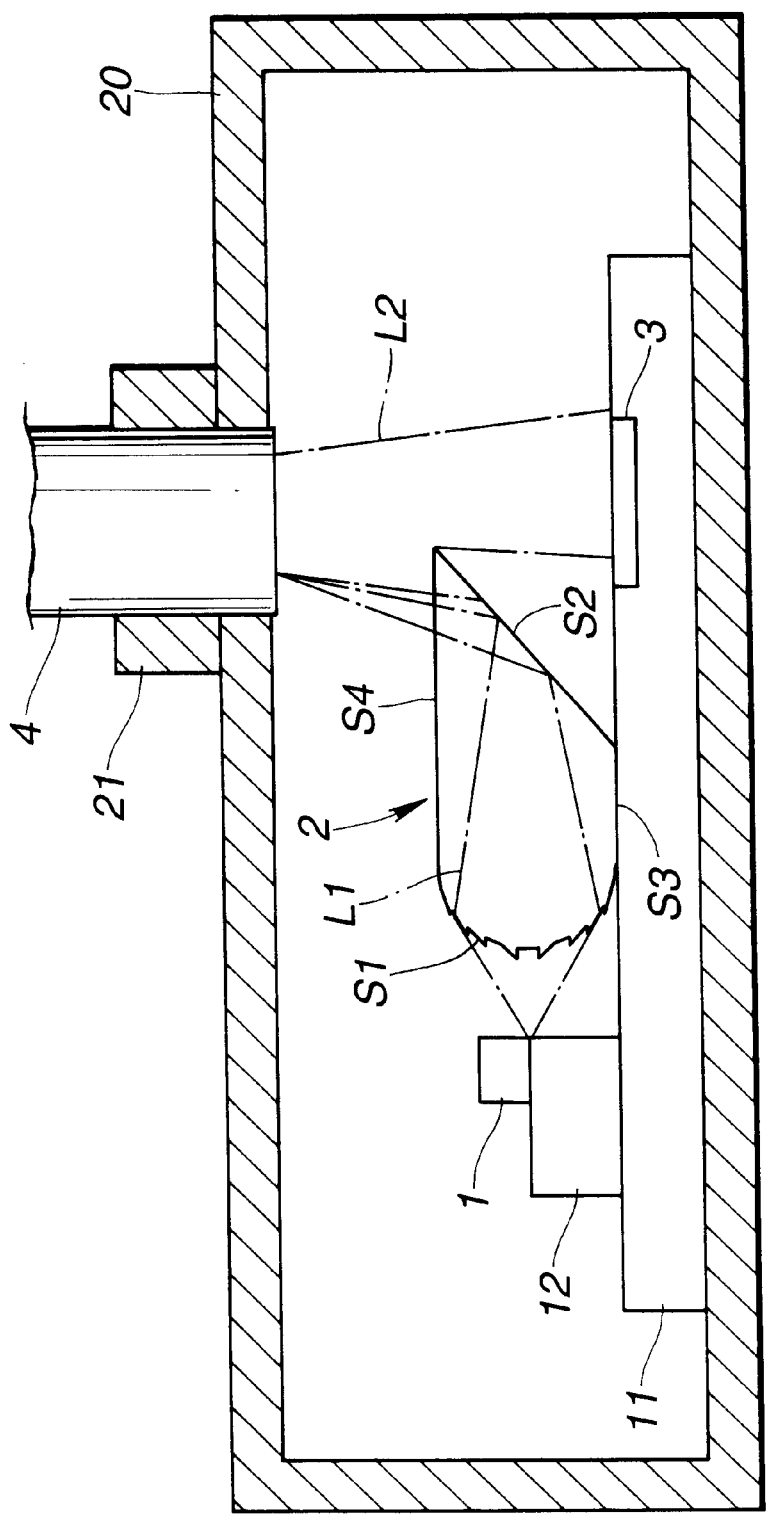
FIG. 20 is a cross-sectional view showing the optical communication apparatus shown in FIG. 19, arranged in a casing.

Using FIGS. 19 and 20, an eighth embodiment of the present invention is explained. In the following description, parts or components which are the same as those of the first embodiment are depicted by the same reference symbols and are not explained specifically.

FIG. 19 shows a diagrammatic view showing the schematics of an eighth embodiment of the optical communication apparatus 10D. In the eighth embodiment of the optical communication apparatus 10D, shown in FIG. 9, a diffraction grating pattern is formed on the lens surface S1 of the optical component 2.

In the present eighth embodiment, in which the diffraction grating pattern is formed on the lens surface S1 of the optical component 2, the lens function ascribable to diffraction is added to the lens surface S1, with the result that the refraction power can be increased, while the correction for aberration is facilitated. Meanwhile, the diffraction grating pattern such as used in the eighth embodiment may be provided on the lens surface S1 of the optical component 2 of each of the first to seventh embodiments.

The optical communication apparatus 10D of the above-described eighth embodiment is arranged in a casing 20, as shown in FIG. 20, showing a cross-section of the respective component parts of FIG. 19 arranged in the casing 20.

In the above-described eighth embodiment of the optical communication apparatus 10D, in which the diffraction grating pattern is formed on the surface S1 of the optical component 2, the diffractive power can be increased to reduce the size of the apparatus.

Also, in the present eight embodiment of the optical communication apparatus 10D, as in the first to seventh embodiments, it is possible to reduce the size and the production cost of the apparatus, while it is possible to prevent the signal S/N ratio from being lowered.

Figure 21:
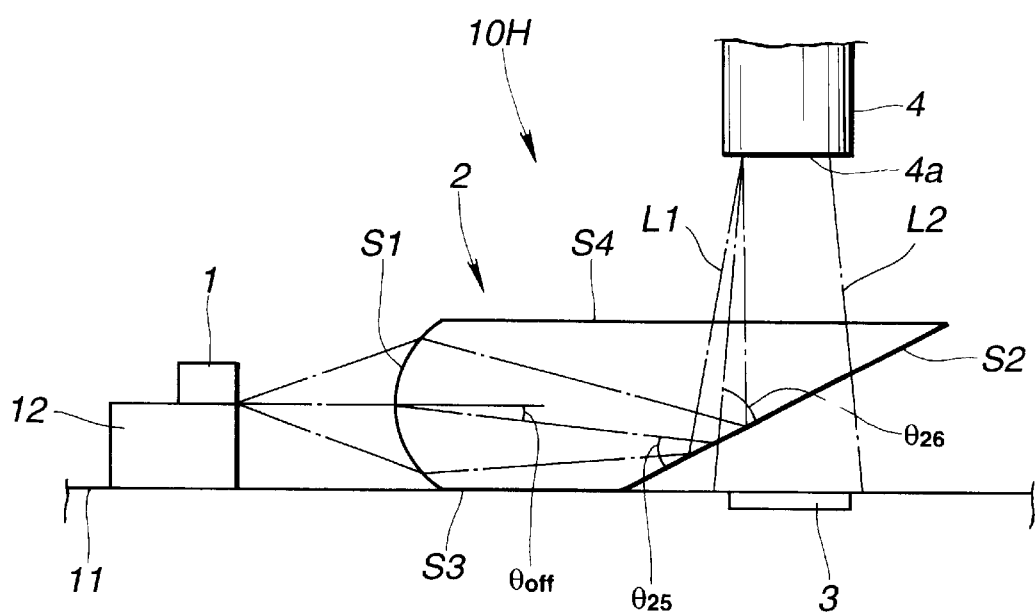
FIG. 21 is a diagrammatic view showing schematics of an optical communication apparatus according to a ninth embodiment of the present invention.
Figure 22:
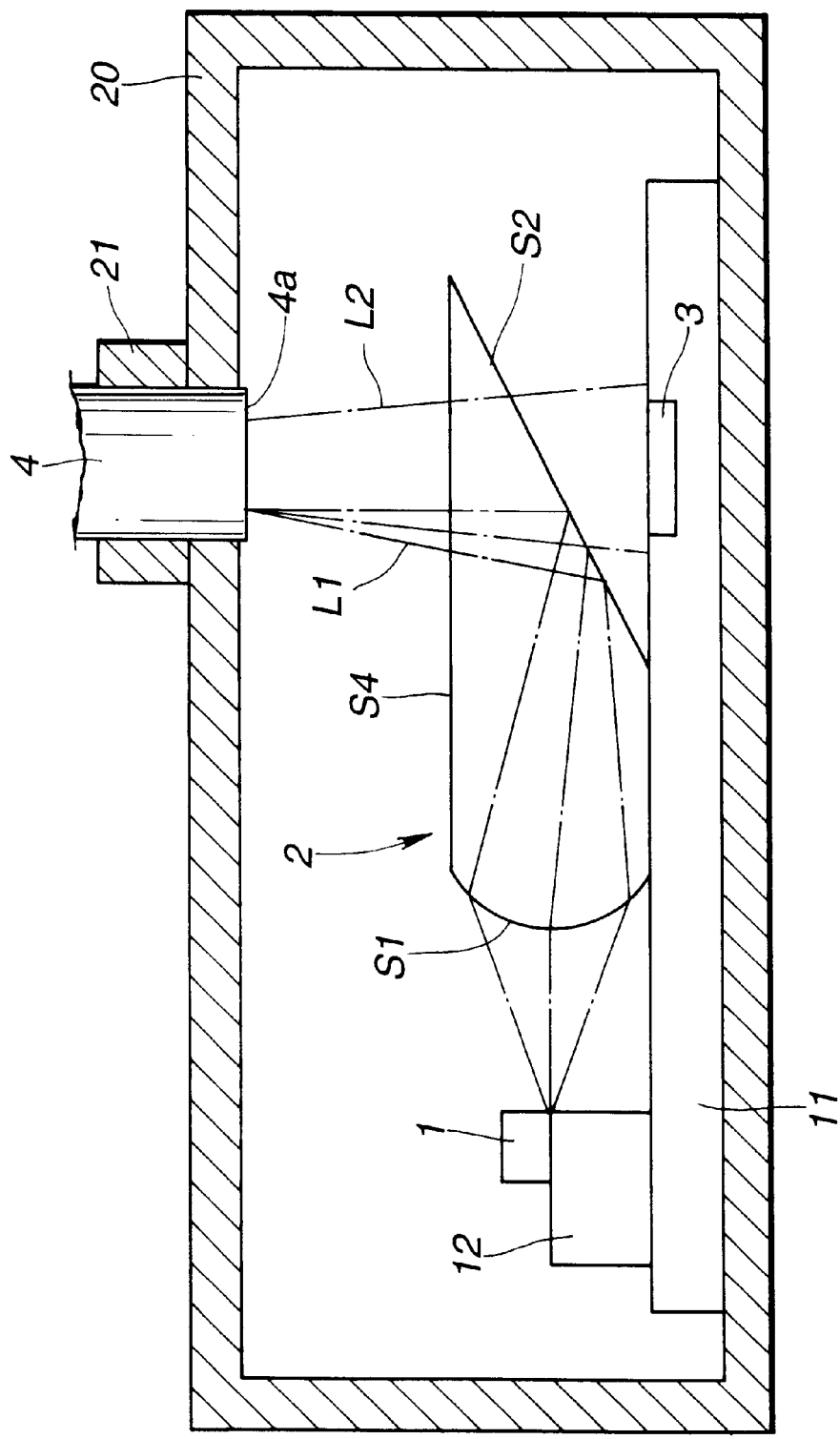
FIG. 22 is a cross-sectional view showing the optical communication apparatus shown in FIG. 21, arranged in a casing.

Referring to FIGS. 21 and 22, a ninth embodiment of the present invention is explained. In the following description, parts or components which are the same as those of the first embodiment are depicted by the same reference symbols and are not explained specifically.

FIG. 21 is a diagrammatic view showing the schematics of an optical communication apparatus 10H according to the ninth embodiment of the present invention. In the present ninth embodiment of the optical communication apparatus 10H, shown in FIG. 21, the light converging action and the refractive action of changing the optical axis direction are afforded to the lens surface S1 of the optical component 2. That is, the lens surface S1 of the optical component 2 in the present ninth embodiment converges the light radiated from the light source 1 in the similar manner to the aforementioned respective embodiments, while bending the optical axis of the light radiated from the: light source 1 so that the optical axis will be offset at an angle indicated by $\theta_{off}$ shown in FIG. 21. Also, in the present eighth embodiment, the angle $\theta_{25}$ which the optical: axis after refraction by the lens surface S1 makes with the reflective surface S2 will meet the aforementioned condition of the critical angle $\theta c$. Stated differently, in the present ninth embodiment, the angle $\theta 25$ which the optical axis after refraction by the lens surface S1 makes with the reflective surface S2 is designed to meet the condition of the critical angle $\theta c$ even though the optical axis of the light radiated from the light source 1 is bent so that the optical axis is offset an angle $\theta_{off}$ by the lens surface S1. In this case, the light radiated from the light source 1 to be incident on the reflecting surface S2 undergoes total reflection on the reflection surface S2. Moreover, in the eighth embodiment, the light reflected by the reflecting surface S2 falls on the end face 4a at substantially the right angle. The light reflected by the end face 4a of the optical transmission medium 4 falls in this manner on the end face 4a of the optical transmission medium 4 at substantially the right angle, whereby low dispersion is achieved.

On the other hand, in the ninth embodiment, the reception light radiated from the end face 4a of the optical transmission medium 4 falls on the coupling surface S4 of the optical component 2 and on the reflecting surface S2 in this order. It is noted that the angle which the optical axis of the reception light radiated from the end face 4a of the optical transmission medium 4 makes with the reflecting surface S2 is an angle θ26 not satisfying the aforementioned critical angle θc. In other words, in the present ninth embodiment, the reflecting surface S2 has a tilt satisfying the critical angle θc capable of reflecting the transmission light incident via the lens surface S1 by total reflection, however, the tilt is such that the reception light radiated from the end face 4a of the optical transmission medium 4 is transmitted since it fails to meet the condition of the critical angle θc. That is, the reception light transmitted through the reflection surface S2 is received by the photodetector 3 arranged on the optical axis of the reception light radiated from the end face 4a of the optical transmission medium 4.

The above-described ninth embodiment of the optical communication apparatus 10H is arranged in the casing 20, as shown in FIG. 22, showing a cross-section of the respective component parts of FIG. 21 arranged in the casing 20.

In the present ninth embodiment of the optical communication apparatus 10H, the transmission light falls on the end face 4a of the optical transmission medium 4 at substantially the Light angle, whereby low dispersion is achieved. Moreover, since the photodetector 3 can be arranged below the reflecting surface S2, the apparatus can be reduced in size.

Also, in the present ninth embodiment of the optical communication apparatus 10H, as in the first to eighth embodiments, it is possible to reduce the size and the production cost of the apparatus, while it is possible to prevent the signal S/N ratio from being lowered.

Referring to FIGS. 21 and 22, a tenth embodiment of the present invention is explained. In the following description, parts or components which are the same as those of the first embodiment are depicted by the same reference symbols and are not explained specifically.

Figure 23:
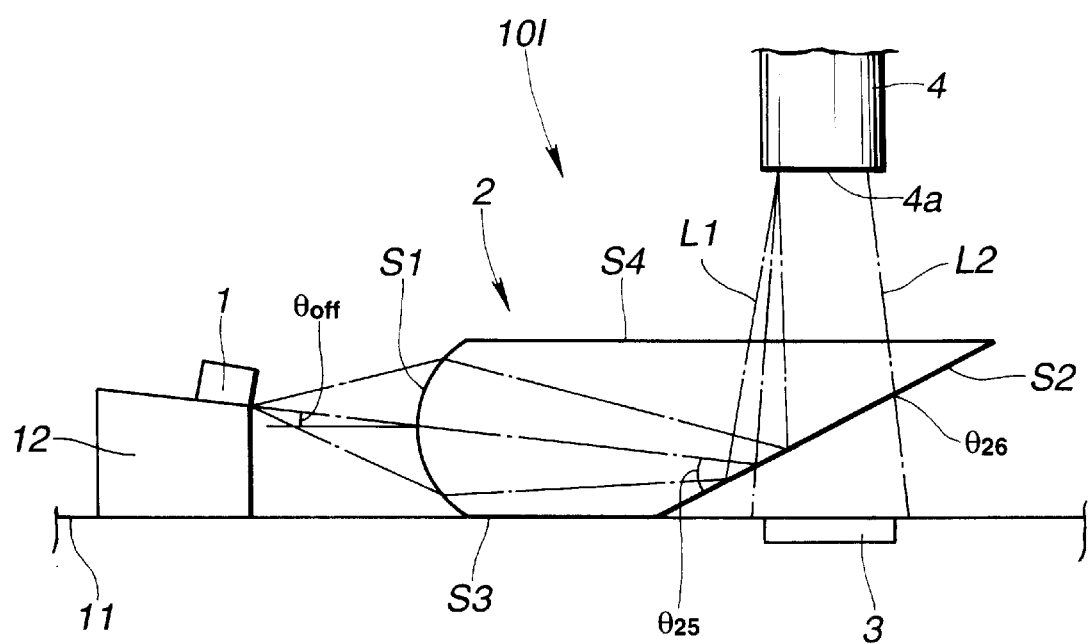
FIG. 23 is a diagrammatic view showing schematics of an optical communication apparatus according to a tenth embodiment of the present invention.

FIG. 23 is a diagrammatic view showing the schematics of an optical communication apparatus 10I according to the tenth embodiment of the present invention. In the above-described ninth embodiment, the diffractive action of offsetting the optical axis of the light radiated by the light source 1 is afforded to the lens surface S1 of the optical component 2. In the present tenth embodiment, the support base 12 carrying the light source 1 is tilted to tilt the optical axis of the light radiated from the light source 1 by an angle $\theta_{off}$ relative to the substrate 11. By so doing, the lens surface S1 of the optical component 2 of the tenth embodiment having only the lens function as in the aforementioned first embodiment can be used, whilst the angle $\theta_{25}$ which the optical axis of the outgoing light from the light source 1 makes with the reflection surface S2 can be set to an angle satisfying the condition of the critical angle θc.

In the tenth embodiment, the reception light radiated from the end face 4a of the optical transmission medium 4 falls on the coupling surface S4 of the optical component 2 and on the reflecting surface S2 in this order. At this time, the angle which the reception light radiated from the end face 4a of the optical transmission medium 4 makes with the reflecting surface S2 is an angle $\theta_{26}$ not satisfying the condition of the critical angle θc. Thus, the reception light radiated from the end face 4a of the optical transmission medium 4 is transmitted through the reflecting surface S2 so as to be received by the photodetector 3.

Figure 24:
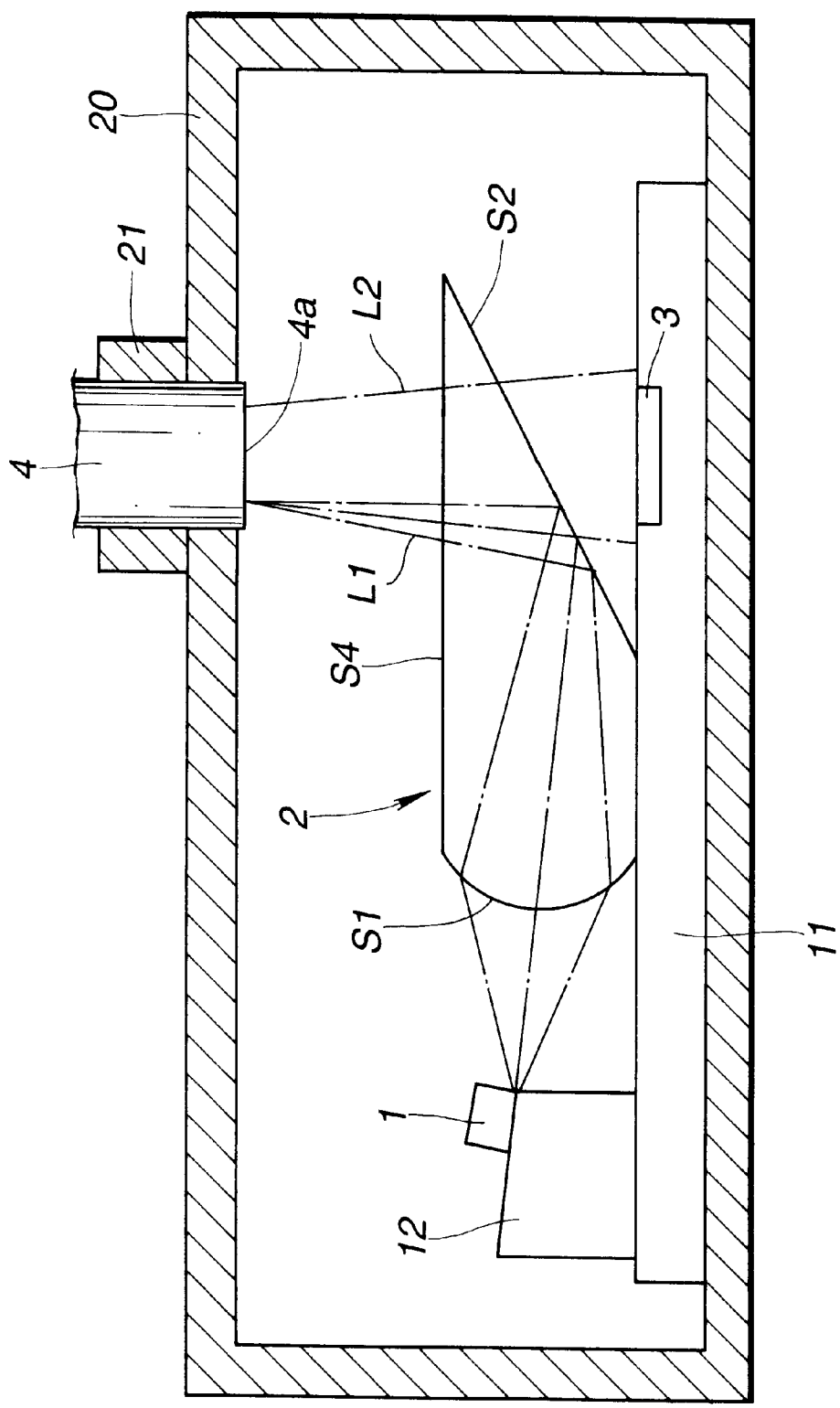
FIG. 24 is a cross-sectional view showing the optical communication apparatus shown in FIG. 23, arranged in a casing.

The above-described tenth embodiment of the optical communication apparatus 10I is arranged in the casing 20, as shown in FIG. 24, showing a cross-section of the respective component parts of FIG. 23 arranged in the casing 20.

In the present; tenth embodiment of the optical communication apparatus 10I, the transmission light falls on the end face 4a of the optical transmission medium 4 at substantially the right angle, whereby low dispersion is achieved. Moreover, since the photodetector 3 can be arranged below the reflecting surface S2, the apparatus can be reduced in size.

Also, in the present tenth embodiment of the optical communication apparatus 10I, as in the first to eighth embodiments, it is possible to reduce the size and the production cost of the apparatus, while it is possible to prevent the signal S/N ratio from being lowered.

A specified embodiment of the optical component 2 used in the respective first to tenth embodiments is hereinafter explained. In the following description, parts or components which ;are the same as those of the first embodiment are depicted by the same reference symbols and are not explained specifically.

Figure 25:
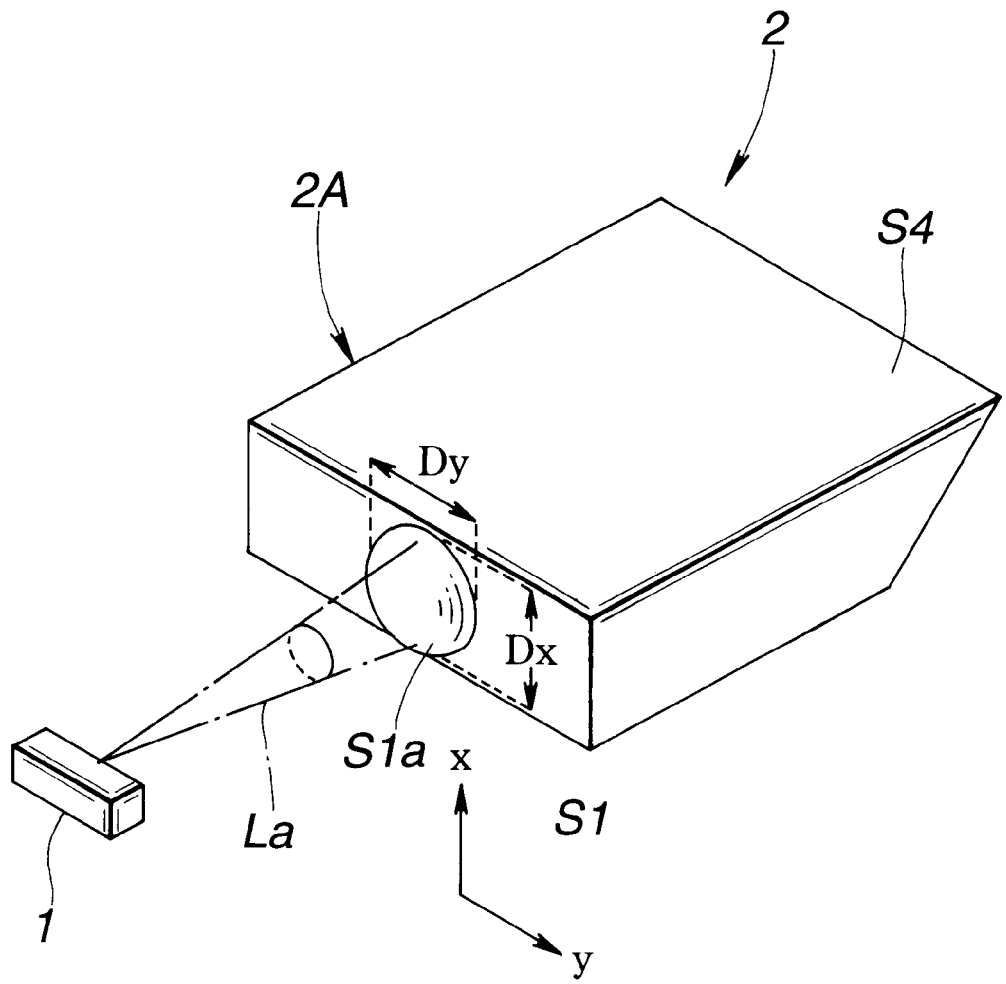
FIG. 25 is a perspective view showing a first specified embodiment of optical communication apparatus of the various embodiments of the present invention.

FIG. 25 shows a schematic perspective view showing the optical component 2A of the first specified embodiment used in any of the first to tenth embodiments. In FIG. 25, the light source 1 is also shown.

On the lens,: surface S1 of the present first specified embodiment facing the light source 1 is formed a lens portion S1a responsible for the lens function. The lens portion S1a is formed only on the portion of the lens surface S1 illuminated by a light beam La of the light source radiated from the light source 1. The lens portion S1a is shaped to conform to the far-field pattern of the light beam of the light source La and has different numerical aperture NA and different far-field patterns of the light beam of the light source La depending on the far-field pattern of the light beam of the light source La. The lens portion S1a converges the incident light beam by its lens function.

Figure 26:
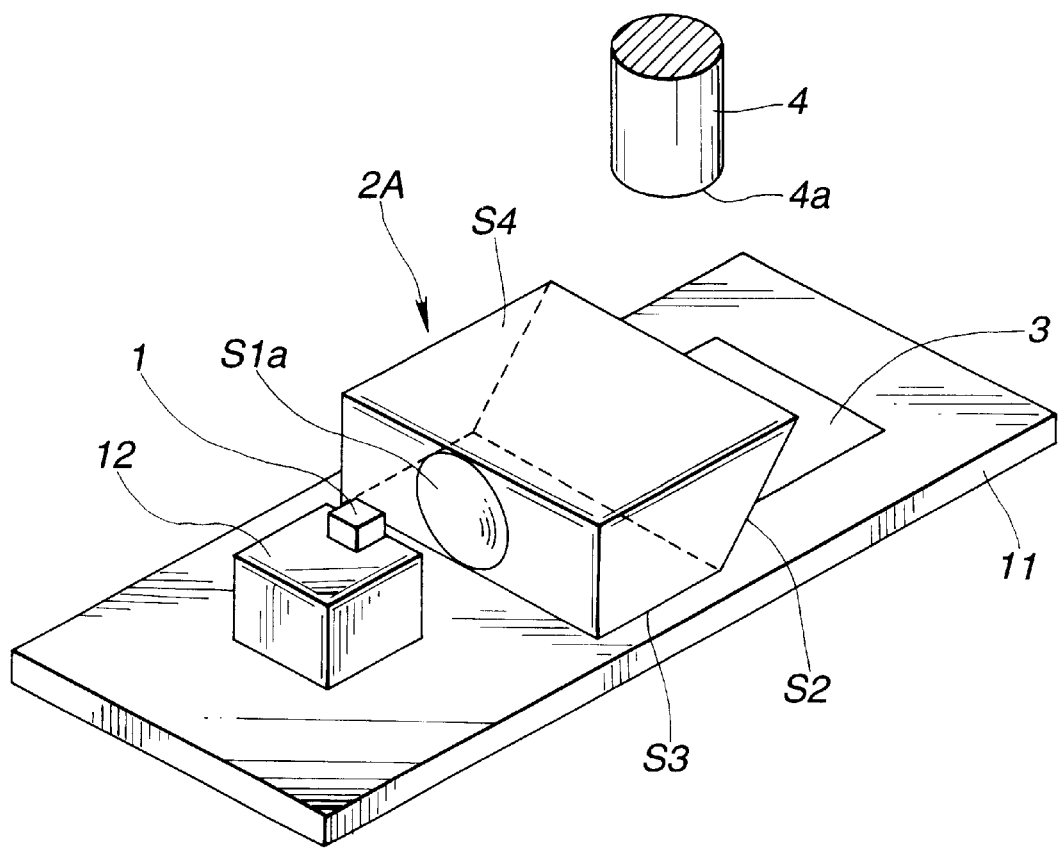
FIG. 26 is a perspective view showing an arrangement of respective constituent elements of optical communication apparatus employing the optical components of FIG. 25.
Figure 27:
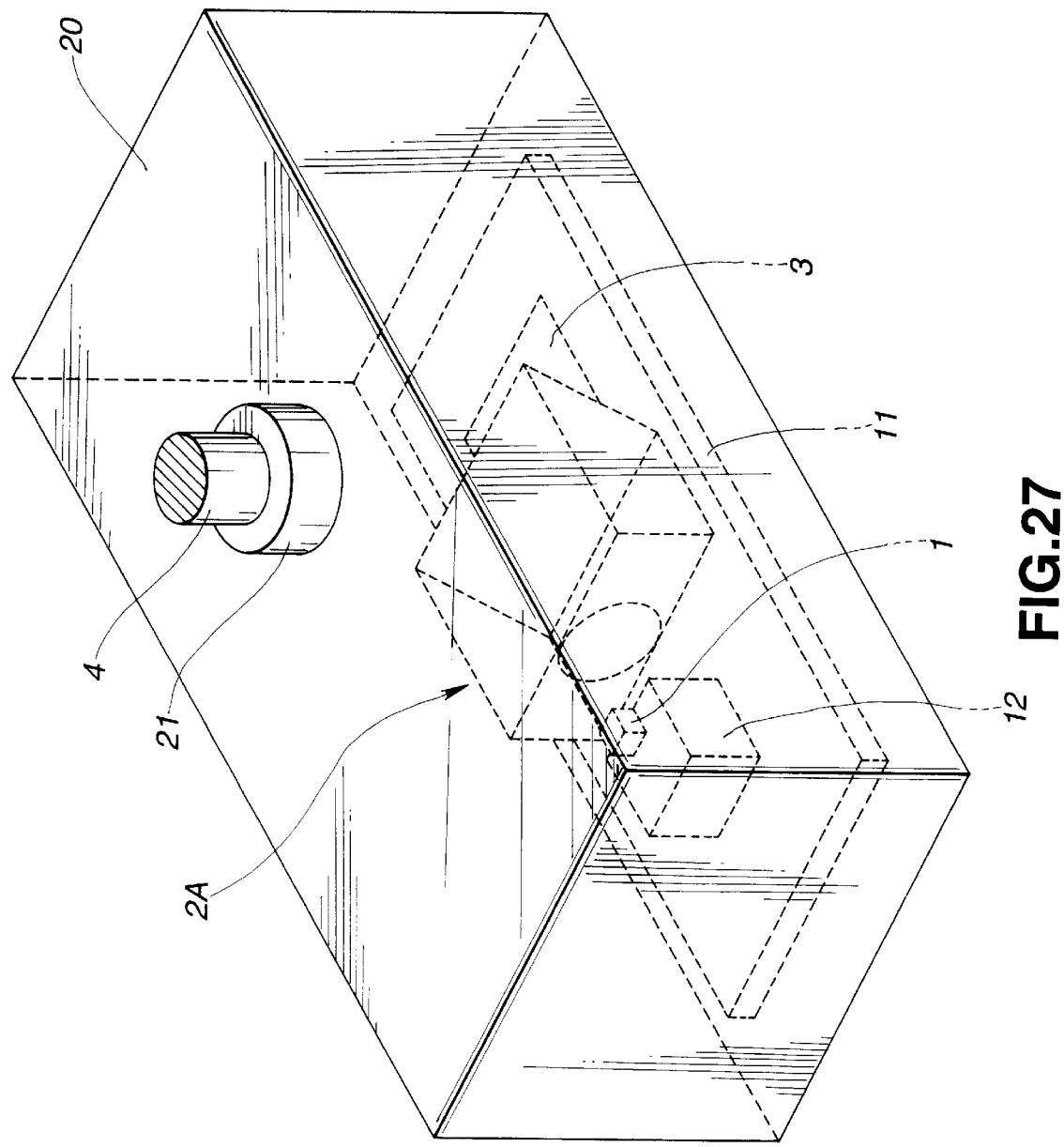
FIG. 27 is a see-through perspective view showing the state in which the optical communication apparatus employing the optical component of FIG. 25 is arranged in a casing.

FIG. 26 shows the arraying state of the substrate 11, support base 12, light source 1, optical component 2A, photodetector 3 and the optical transmission medium 4 in case the optical component 2A of the first specified embodiment is applied to the aforementioned first embodiment of the optical communication apparatus 10, whilst FIG. 27 shows a perspective view of the optical communication apparatus having respective components shown in FIG. 26 arranged in the casing 20. In the embodiments of FIGS. 26 and 27, the transmission light radiated from the light source 1 is reflected by the reflection surface S2 to fall on the end face 4a of the optical transmission medium 4, as the transmission light is converged by the lens portion S1a of the optical component 2A. FIGS. 26 and 27 show an embodiment in which the optical component 2A of the first specified embodiment is applied to the aforementioned first embodiment, however, the optical component 2A may also be applied to the second to tenth embodiments.

In the optical communication apparatus having t the optical component 2A of the first specified embodiment, in which the lens portion S1a shaped to conform to the far-field pattern of the light beam of the light source La is formed on the lens surface S1 of the optical component 2A, the light beam of the light source La, issued from the light source 1, can be caused to fall wastelessly into the optical component 2A to fall on the end face 4a of the optical transmission medium 4.

Figure 28:
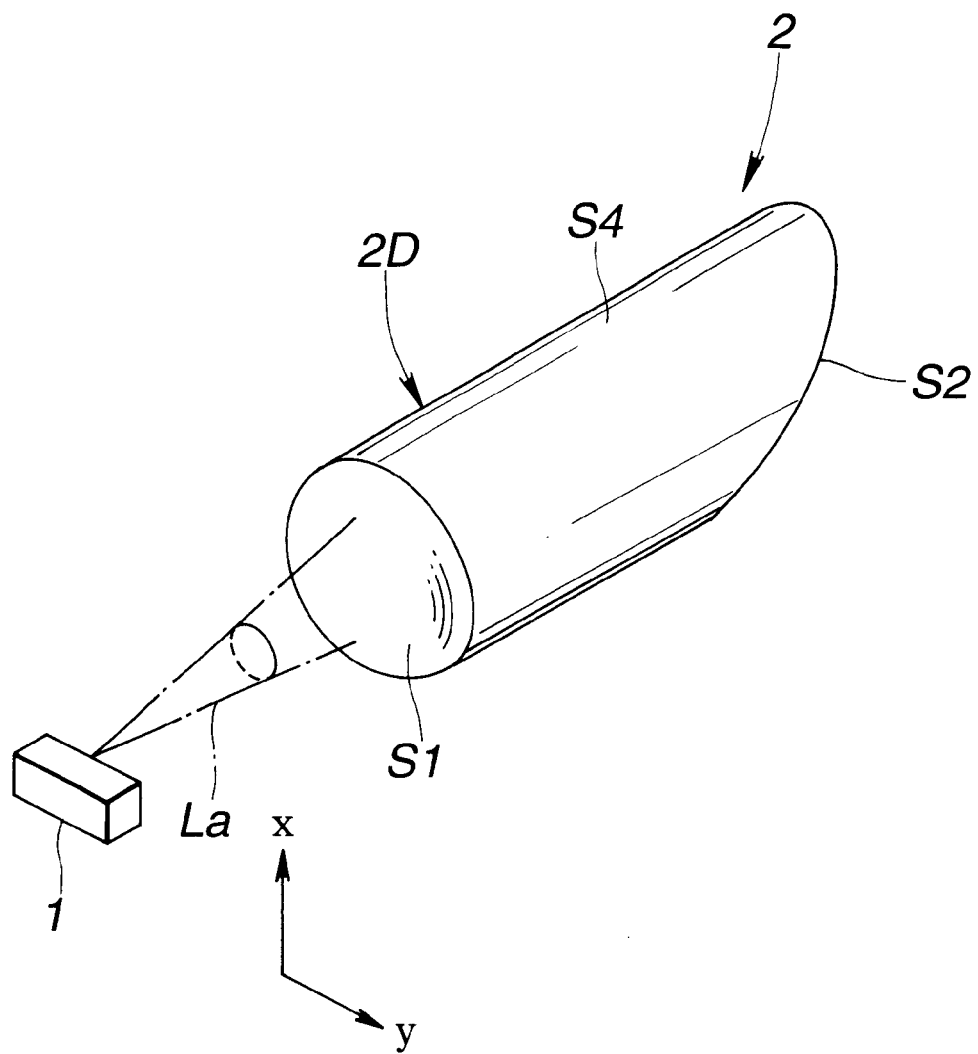
FIG. 28 is a perspective view showing a second specified embodiment of optical communication apparatus of the various embodiments of the present invention.

FIG. 28 shows a schematic perspective view of the optical component 2D of a second specified embodiment used in any of the first to tenth embodiments. Meanwhile, FIG. 28 also shows a light source 1.

The optical component 2D of the present second embodiment is constituted by a transparent member which is in the shape of a rod having its long axis extending along the direction of the optical axis of the light radiated from the light source 1, that is a transparent member having a substantially circular cross-sectional shape when the optical component 2D is cut in a plane perpendicular to the optical axis of the light radiated from the light source 1 to get to the reflective surface S2. This rod-like optical component 2D has its one end formed as e.g., a spherical lens surface S1 for producing the lens function, while having the opposite end as the aforementioned reflecting surface S2 having a pre-set angle for allowing for total reflection of the light. Since the optical component 2D of the present second specified embodiment is rod-shaped, the coupling surface S4, provided in the proceeding direction of the light reflected by the reflecting surface S2, is not planar but curved in profile.

Figure 29:
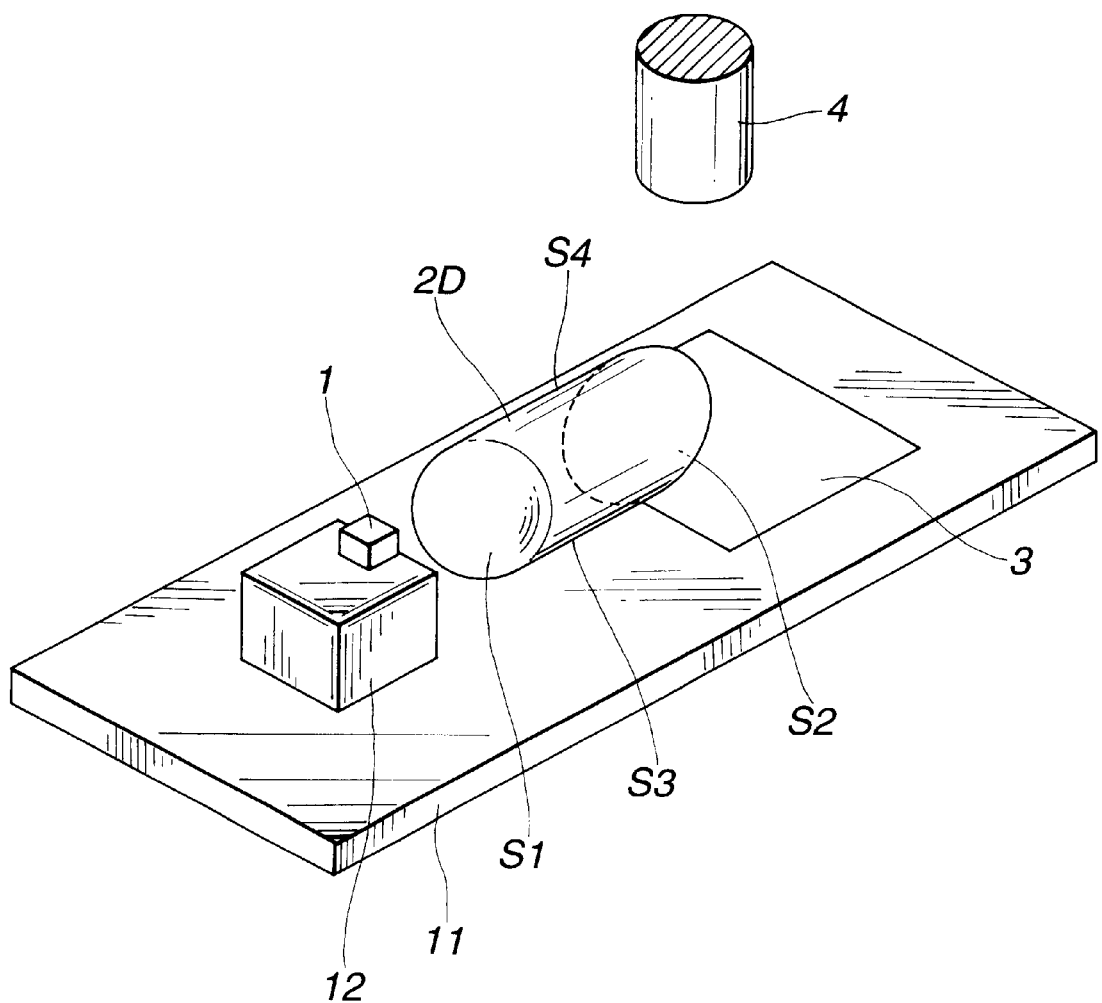
FIG. 29 is a perspective view showing an arrangement of respective constituent elements of optical communication apparatus employing the optical components of FIG. 28.
Figure 30:
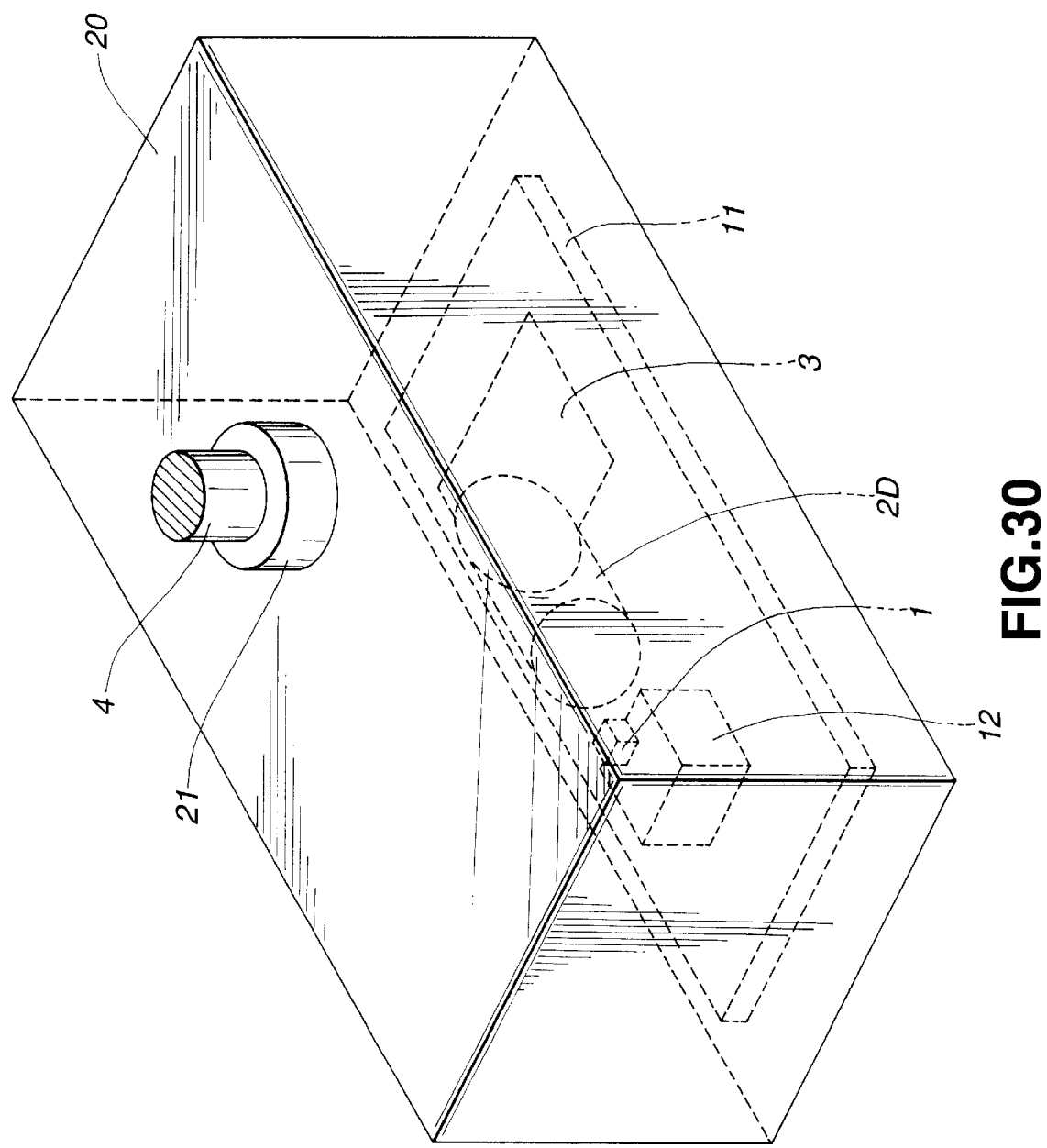
FIG. 30 is a see-through perspective view showing the state in which the optical communication apparatus employing the optical component of FIG. 25 is arranged in a casing.

FIG. 29 shows the arraying state of the substrate 11, support base 12, light source 1, optical component 2D, photodetector 3 and the optical transmission medium 4 in case the optical component 2A of the first specified embodiment is applied to the aforementioned first embodiment of the optical communication apparatus 10, whilst FIG. 30 shows a perspective view of the optical communication apparatus having respective components shown in FIG. 29 arranged in the casing 20. In the embodiments of FIGS. 29 and 30, the transmission light radiated from the light source 1 is reflected by the reflection surface S2 to fall on the end face 4a of the optical transmission medium 4, via coupling surface S4, as the transmission light is converged by the lens portion S1a of the optical component 2A. FIGS. 29 and 30 show an embodiment in which the optical component 2D of the first specified embodiment is applied to the aforementioned first embodiment, however, the optical component 2A may also be applied to the second to tenth embodiments.

If the optical component 2D of the present second specified embodiment is used, the curved coupling surface S4 has the lens function, so that the transmission light radiated from the light source 1, converged by the lens surface S1 and reflected by the reflecting surface S2 is further converged by the coupling surface S4, as a result of which it becomes possible to reduce the focal length from the coupling surface S4 to the end face 4a of the optical transmission medium 4. If, in the second and fourth embodiments, the optical component 2D and the photodetector 3 are arranged in the same area, with the reception light radiated from the end face 4a of the optical transmission medium 4 being made to fall on the optical component 2D via the coupling surface S4, the reception light radiated from the incident on the coupling surface S4 to fall on the end face 4a of the optical transmission medium 4 is converged by the lens function furnished by the curved surface of the coupling surface S4, as a result of which the distance from the coupling surface S4 to the photodetector 3 can be reduced. Moreover, in the present embodiment, the reception light is incident on the photodetector 3, as the light is converged thereon, without being diffused, due to the lens function furnished by the curved surface of the coupling surface S4. Thus, the reception light can be made to fall efficiently on the photodetector 3.

Figure 31:
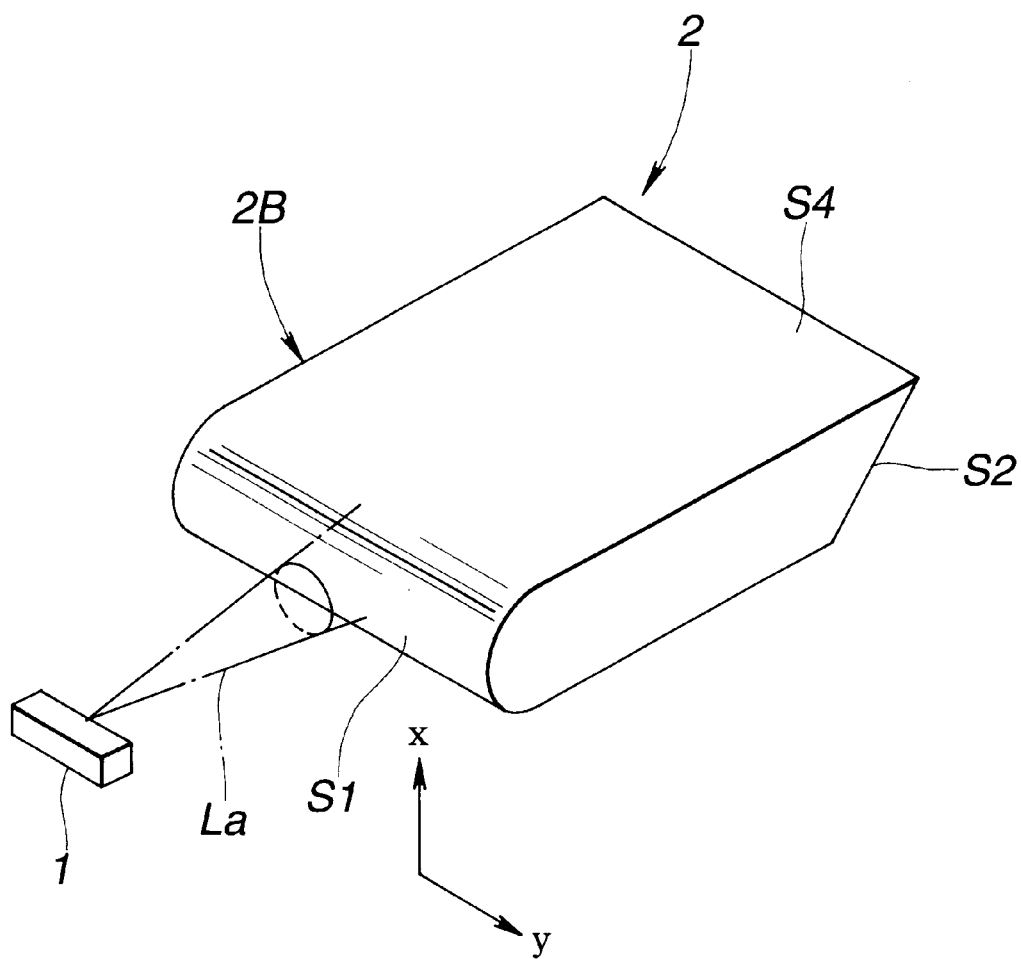
FIG. 31 is a perspective view showing a third specified embodiment of optical communication apparatus of the various embodiments of the present invention.

FIG. 31 shows la schematic perspective view of the optical component 2B of the third specified embodiment used in any of the first to tenth embodiments. Meanwhile, FIG. 31 also shows the light source 1.

In the present third embodiment of the optical component 2B, the lens surface S1 facing the light source 1, has a columnar-shaped surface having a curvature only in the x-direction, or a so-called cylindrical surface. This columnar-shaped lens surface S1 operates for converging only the x-direction component of the incident light beam. Thus, in the present third specified embodiment of the optical component 2B, if the far-field pattern of the light beam of the light source La is elliptically-shaped with the long axis being in the x-direction, the light beam of the light source La is made to fall wastelessly on the optical component 2B so as to be converged thereon.

Figure 32:
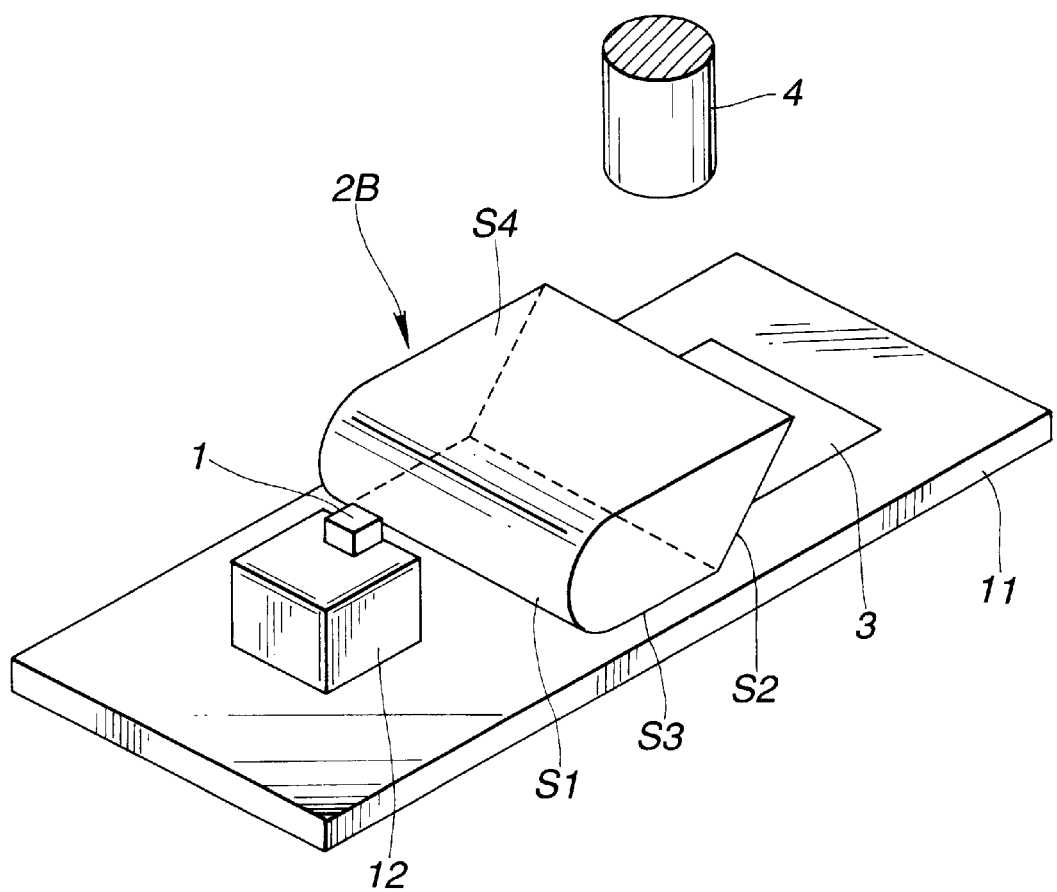
FIG. 32 is a perspective view showing an arrangement of respective constituent elements of optical communication apparatus employing the optical components of FIG. 31.
Figure 33:
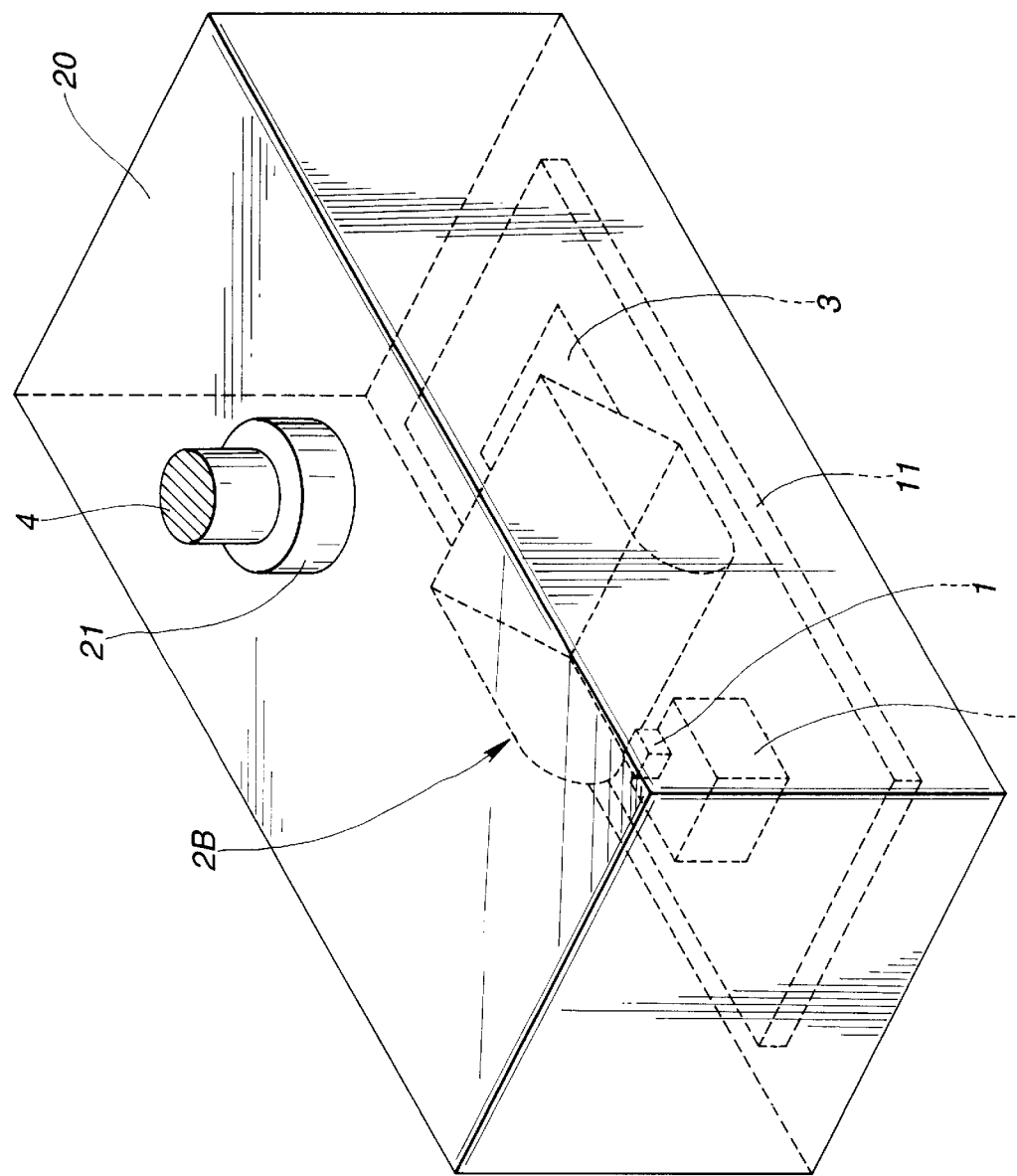
FIG. 33 is a see-through perspective view showing the state in which the optical communication apparatus employing the optical component of FIG. 31 is arranged in a casing.

FIG. 32 shows the arraying state of the substrate 11, support base 12, light source 1, optical component 2B, photodetector 3 and the optical transmission medium 4 in case the optical component 2B of the third specified embodiment shown in FIG. 31 is applied to the aforementioned first embodiment of the optical communication apparatus 10, whilst FIG. 33 shows a perspective view of the optical communication apparatus having respective components of FIG. 32 arranged in the casing 20. In the embodiments of FIGS. 32 and 33, the transmission light radiated from the light source 1 is reflected by the reflection surface S2 to fall on the end face 4a of the optical transmission medium 4, via coupling surface S4, as the transmission light is converged by the lens portion S1 of the optical component 2B. FIGS. 32, 33 show an embodiment in which the optical component 2B of the third specified embodiment is applied to the aforementioned first embodiment, however, the optical component 2B may also be applied to the second to tenth embodiments.

In the optical communication apparatus, employing the optical component 2B of the third specified embodiment, the lens surface S1 of the optical component 2B is formed as a columnar-shaped cylindrical surface having the curvature only in the x-direction. Thus, as compared to the above-described first specified embodiment of the optical component 2A, the optical axis adjustment tolerance in the y-direction of the optical component 2B is released to reduce the assembling cost. Also, in the optical communication apparatus employing the third specified embodiment of the optical component 2B, in which the lens surface S1 of the optical component 2B operates for converging only the x-components of the incident light beam, if the far-field pattern of the light beam of the light source is elliptically-shaped with the long axis lying in the x-direction, it becomes possible to cause the light beam of the light source La emitted by the light source 1 to be incident and converged effectively and wastelessly in the optical component 2B.

Figure 34:
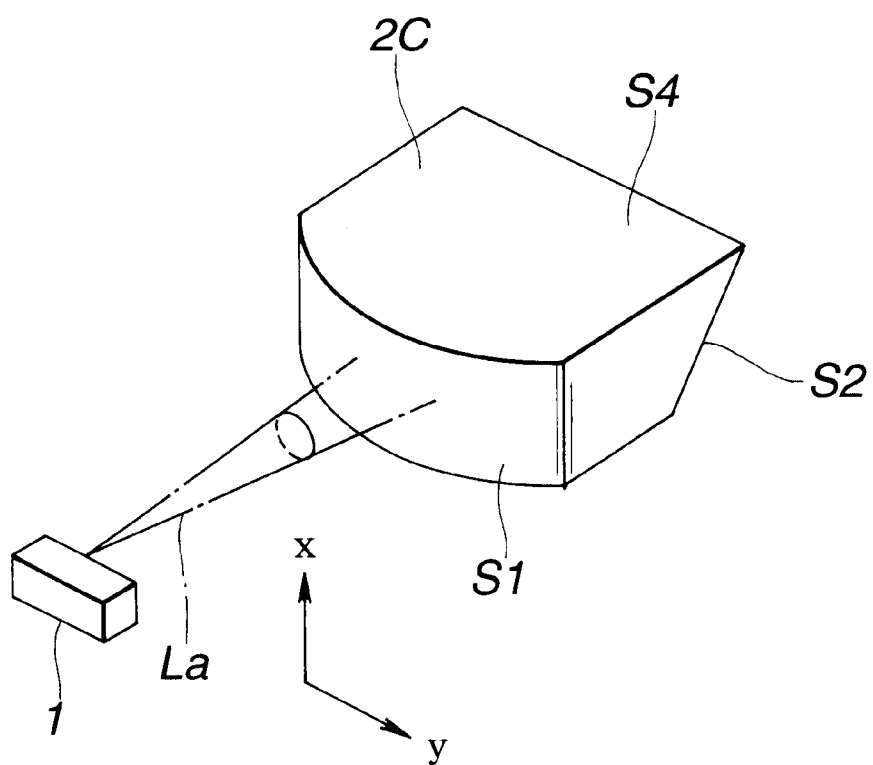
FIG. 34 is a perspective view showing a fourth specified embodiment of optical communication apparatus of the various embodiments of the present invention.

FIG. 34 shows a schematic perspective view of the optical component 2C of the fourth specified embodiment used in any of the first to tenth embodiments. Meanwhile, FIG. 34 also shows the light source 1.

In the foregoing explanation of the first to tenth embodiments, the optical component 2 is taken as an example, in which the cross-sectional shape of the lens surface portion S1 thereof obtained on slicing the optical component 2 in a plane perpendicular to the substrate 11 and containing the optical axis of light radiated from the light source 1 to get to the reflecting surface S2 is curved and convexed towards the light source 1, as shown in FIGS. 1, 2, 5 to 15 and 17 to 20. It is however possible to use as the optical component used in each of the first to tenth embodiments such an optical component 2C in which the cross-sectional shape of the lens surface portion S1 thereof obtained on slicing the optical component 2 in a plane perpendicular to the substrate 11 and containing the optical axis of light radiated from the light source 1 to get to the reflecting surface S2 is linear, and in which the cross-sectional shape of the lens surface portion S1 thereof obtained on slicing the optical component 2 in a plane transverse to the substrate 11 and containing the optical axis of light radiated from the light source 1 to get to the reflecting surface S2 is curved and convexed towards the light source 1, as shown in FIG. 34.

Specifically, the present fourth embodiment of the optical component 2C has its lens surface S1 facing the light source 1 formed as a columnar-shaped surface having a curvature only in the y-direction in the drawing, that is a so-called cylindrical surface. This columnar-shaped lens surface S1 operates for converging only the y-direction component of the incident light beam. Thus, in the present fourth specified embodiment of the optical component 2C, if the far-field pattern of the light beam of the light source La, radiated by the light source 1, is elliptically-shaped, with the long axis lying along the y-axis, the light beam of the light source La in particular is incident and converged wastelessly and efficiently in the optical component 2C.

Figure 35:
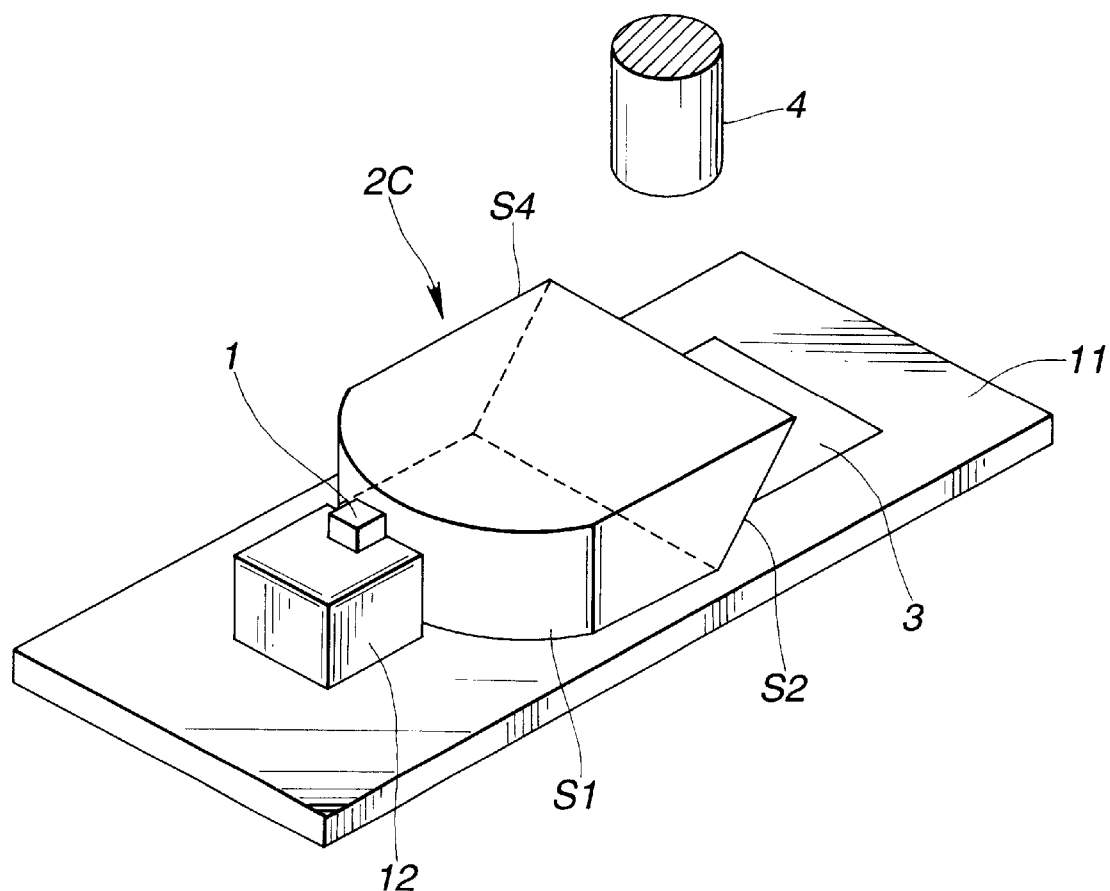
FIG. 35 is a perspective view showing an arrangement of respective constituent elements of optical communication apparatus employing the optical components of FIG. 34.
Figure 36:
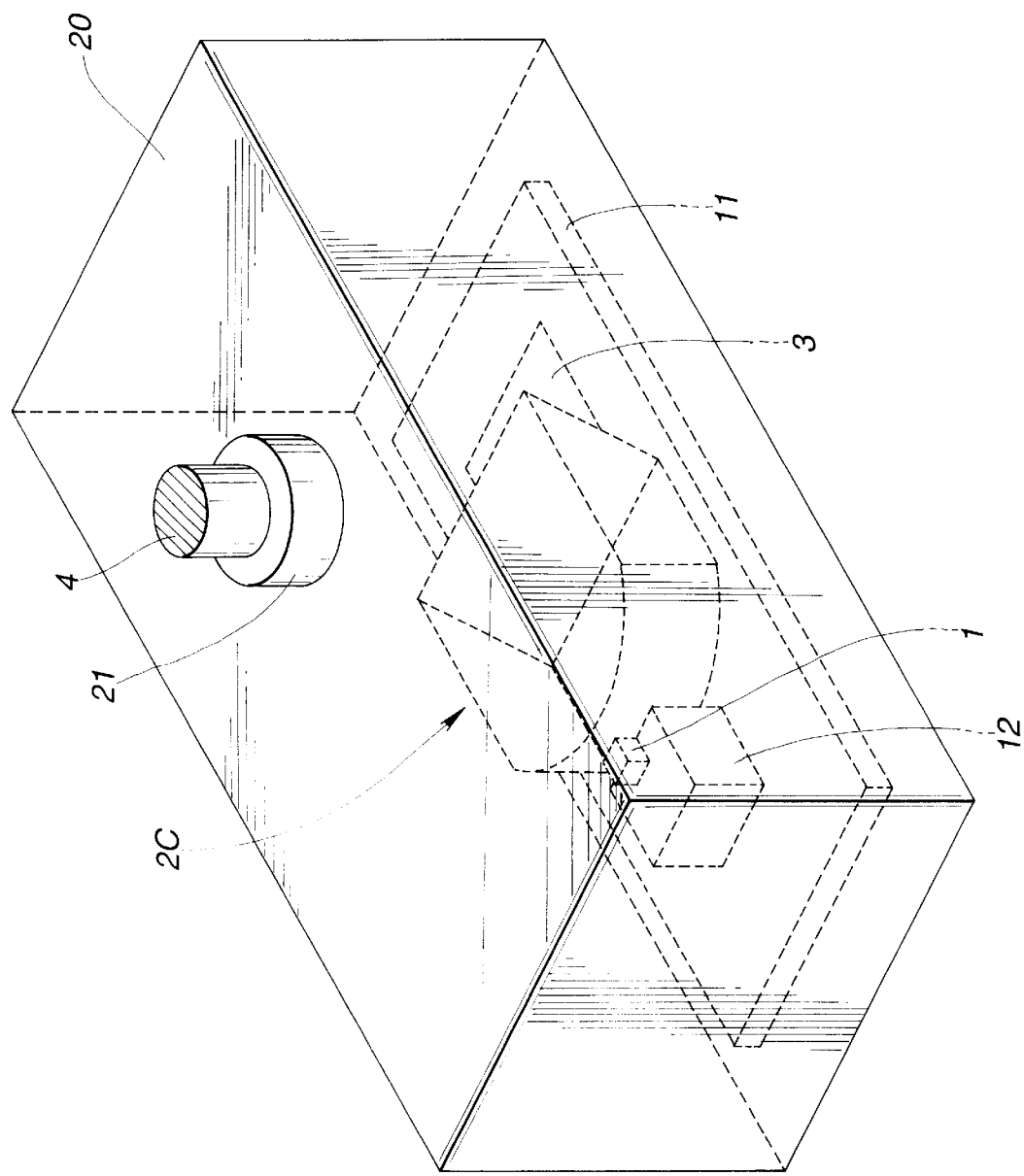
FIG. 36 is a see-through perspective view showing the state in which the optical communication apparatus employing the optical component of FIG. 34 is arranged in a casing.
Figure 37:
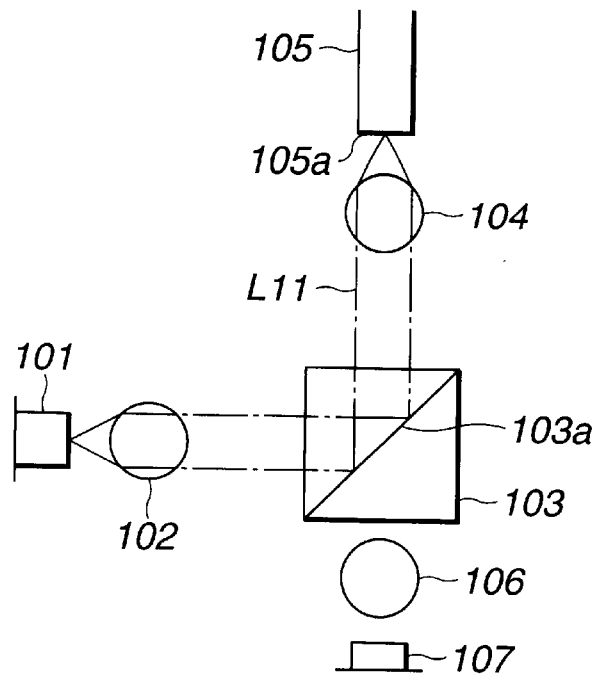
FIG. 37 is a diagrammatic view showing schematics of a conventional optical communication apparatus.
Figure 38:
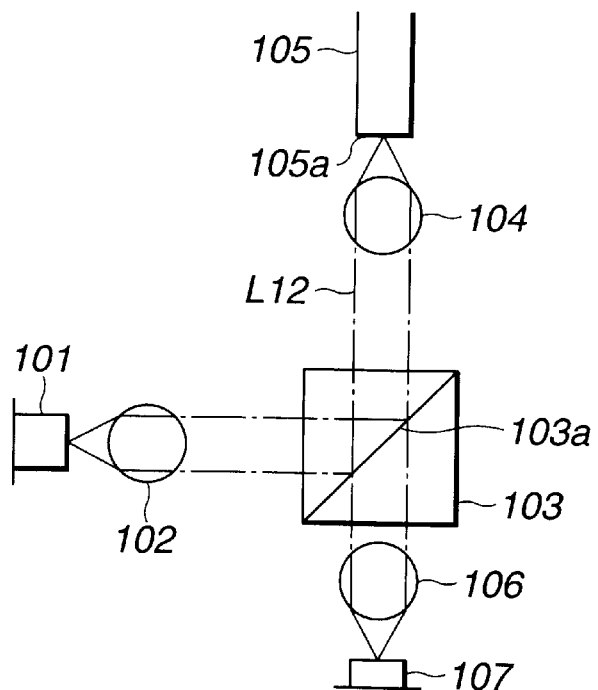
FIG. 38 is a diagrammatic view showing schematics of another conventional optical communication apparatus.

FIG. 35 shows an arraying state of the substrate 11, support base 12, light source 1, optical component 2C of the fourth specified embodiment shown in FIG. 34, photodetector 3 and the optical transmission medium 4 in case the optical component 2C is applied to the aforementioned first embodiment of the optical communication apparatus 10, whilst FIG. 36 shows a perspective view of the optical communication apparatus having respective components of FIG. 35 arranged in the casing 20. In the embodiments of FIGS. 35 and 36, the transmission light radiated from the light source 1 is reflected by the reflection surface S1, as only the y-direction component of the transmission light radiated by the light source 1 is converged by the lens surface portion S1 which is the cylindrical surface of the optical component 2C. FIGS. 35, 36 show an embodiment in which the optical component 2C of the fourth specified embodiment is applied to the aforementioned first embodiment, however, the optical component 2C may also be applied to the second to tenth embodiments.

In the optical communication apparatus, employing the optical component 2C of the fourth specified embodiment, the lens surface S1 of the optical component 2C is formed as a columnar-shaped cylindrical surface having the curvature only in the y-direction. Thus, as compared to the above-described first specified embodiment of the optical component 2A, the optical axis adjustment tolerance in the x-direction of the optical component 2C is released to reduce the assembling cost. Also, in the optical communication apparatus employing the fourth specified embodiment of the optical component 2C, in which the lens surface S1 of the optical component 2C operates for converging only the y-components of the incident light beam, if the far-field pattern of the light beam of the light source La is elliptically-shaped with the long axis lying in the x-direction, it becomes possible to cause the light beam of the light source La emitted by the light source 1 to be incident and converged effectively and wastelessly in the optical component 2B.

The foregoing description is directed to the optical communication apparatus of respective embodiments and optical components of the respective specified embodiments. However, the present invention may be optionally changed without being limited to the above-described embodiments and specified embodiments. For example, in the above-described embodiments and specified embodiments, the total reflection of light is produced for reflecting the light on the reflecting surface S2 of the optical component 2 or the optical components 2A to 2D. However, the reflecting surface S2 may be processed with mirror surface finishing to produce reflection to guide the transmission light towards the optical transmission medium 4. The present invention also is not limited to optical communication and may be applied to a number of usages employing light transmission/reception.

Industrial Applicability

In the optical communication apparatus according to the present invention, in which the transmission light from a light source is converged on a first surface of a sole optical component and reflected towards an optical transmission medium and in which the light incident on the light reception element without falling on the second surface of the optical component is detected as the reception light, it is possible to reduce the cost and size of the apparatus without lowering the transmission/reception performance.

Also, in the: optical apparatus of the present invention, the transmission light from the light source is reflected by the total reflection on the second surface of the optical component, so that, as compared to the conventional apparatus employing e.g., a polarization beam splitter, it is unnecessary to form a high reflection multi-layer film or a polarization beam splitter film, whilst the film-forming cost or the cost of bonding two prisms together to form a polarization beam splitter can be dispensed with.

Moreover, with the optical apparatus of the present invention, in which the optical component is arranged above the light receiving element, the apparatus can be further reduced in size.

With the optical apparatus of the present invention, in which the second surface of the optical component is inclined at an angle of 45° relative to the plane in which the optical component is arranged, the optical component can be fabricated easily to enable further cost reduction.

With the optical apparatus of the present invention, a diffractive pattern producing the light converging operation is formed on the first surface of the optical component, it becomes possible to increase the refractive power further to enable further reduction in size of the apparatus. Moreover, since the aberration can be corrected easily, it is possible to improve the S/N ratio.

With the optical apparatus of the present invention, the optical component is provided with a surface operating to prevent the component from becoming acute in shape to prevent kicking of the reception light to improve operational safety and to render the optical component less susceptible to destruction.

Also, with the optical apparatus of the present invention, the first surface of the optical component is shaped to conform to the light spreading pattern of the light radiated from the light source, so that the light radiated from the light source is caused to be incident and converged wastelessly and effectively in the optical component.

What is claimed is:

1. An optical apparatus, comprising:
    a main body unit;
    a connector;
    an optical transmission medium configured to radiate light along an optical axis and connected to the main body unit by the connector so that an end face of the optical transmission medium is at a pre-set angle with respect to the main body unit;
    a light emitting element fixed in the main body unit and configured to radiate a light beam;
    a light receiving element fixed at a position lying on the optical axis to receive light from the optical transmission medium; and
    a sole optical component having a second surface facing a first surface and having a coupling surface interconnecting the first surface and the second surface to define an inside,
    wherein the sole optical component is fixed at a position arranged offset from the optical axis of the light radiated from the optical transmission medium in the main body unit, wherein the first surface is configured to converge the light beam incident thereon so that the light beam is focussed at a position spaced a pre-set distance from the first surface, and wherein the light emitting element, the light receiving element, the sole optical component, and the connector are secured in a position relative to one another such that a light beam incident on the first surface traverses the inside of the optical component to reflect on the second surface to a point outside the optical component that is adjacent to the end face of the optical transmission medium.

2. An optical apparatus, comprising:

a main body unit;

a connector;

an optical transmission medium configured to radiate light along an optical axis and connected to the main body unit by the connector so that an end face of the optical transmission medium is at a pre-set angle with respect to the main body unit;

a light emitting element fixed in the main body unit and configured to radiate a light beam;

a light receiving element fixed at a position lying on the optical axis to receive light from the optical transmission medium; and a sole optical component having a second surface facing a first surface and having a coupling surface interconnecting the first surface and the second surface to define an inside, wherein the sole optical component is arranged on the optical axis of the light radiated from the optical transmission medium, wherein the light radiated from the optical transmission medium is configured to fall on the coupling surface, to traverse the inside of the sole optical component, and to fall on the light receiving element via a bonding surface facing the coupling surface without impacting the second surface, wherein the first surface is configured to converge the light beam incident thereon so that the light beam is focussed at a position spaced a pre-set distance from the first surface, and wherein the light emitting element, the light receiving element, the sole optical component, and the connector are secured in a position relative to one another such that a light beam incident on the first surface traverses the inside of the optical component to reflect on the second surface to a point outside the optical component that is adjacent to the end face of the optical transmission medium.

3. The optical apparatus according to claim 1 or claim 2 wherein the connector connects the optical transmission medium at an angle with which the optical axis of light radiated from the optical transmission medium is inclined with respect to an optical axis of light radiated from the light emitting element.

4. The optical apparatus according to claim 3 wherein the light receiving element is arranged on a first side of the second surface and the light emitting element is arranged on a second side of the surface of the optical component, wherein the first side of the second surface is opposite the second side of the second surface.

5. The optical apparatus according to claim 3 wherein both the light receiving element and the light emitting element are arranged on a first side of the second surface and wherein light radiated from the optical transmission medium is configured to fall on the coupling surface, to traverse the inside of the optical component, and to fall on the light receiving element.

6. The optical apparatus according to claim 1 or claim 2 wherein the connector connects the optical transmission medium at an angle such that the optical axis of light radiated from the optical transmission medium is included in a plane perpendicular to an optical axis direction of light radiated from the light emitting element.

7. The optical apparatus according to claim 1 or claim 2 wherein a diffractive pattern is disposed on the first surface of the optical component.

8. The optical apparatus according to claim 1 or claim 2 wherein the optical component further has a third surface disposed between the second surface and the coupling surface so as to be at least proximate to the connector.

9. The optical apparatus according to claim 1 or claim 2 wherein a cross-section of the first surface of the optical component taken through the optical path of transmitted light is convexed towards the light emitting element.

10. The optical apparatus according to claim 1 or claim 2 wherein a cross-section of the first surface of the optical component taken perpendicular to the optical path of transmitted light is convexed towards the light emitting element.

* * * * *